US010438508B2

(12) United States Patent
Shinomoto et al.

(10) Patent No.: US 10,438,508 B2
(45) Date of Patent: Oct. 8, 2019

(54) METHOD FOR DISTRIBUTING INFORMATION, SERVER APPARATUS, AND NETWORK SYSTEM

(71) Applicant: Panasonic Intellectual Property Management Co., Ltd., Osaka (JP)

(72) Inventors: Yuki Shinomoto, Tokyo (JP); Hiroyuki Kubotani, Hyogo (JP); Yasuhiro Yuki, Kanagawa (JP)

(73) Assignee: PANASONC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 423 days.

(21) Appl. No.: 15/333,175

(22) Filed: Oct. 24, 2016

(65) Prior Publication Data

US 2017/0132948 A1    May 11, 2017

(30) Foreign Application Priority Data

Nov. 6, 2015 (JP) .................................. 2015-218970
Jul. 4, 2016 (JP) .................................. 2016-132809

(51) Int. Cl.
*H04L 12/28* (2006.01)
*G09B 19/00* (2006.01)
(Continued)

(52) U.S. Cl.
CPC ........... *G09B 19/0092* (2013.01); *G09B 7/00* (2013.01); *H04L 12/2803* (2013.01); *H04L 67/12* (2013.01)

(58) Field of Classification Search
CPC ....... G09B 19/0092; G09B 7/00; H04L 67/12; H04L 12/2803

(Continued)

(56) References Cited

U.S. PATENT DOCUMENTS

2003/0192887 A1* 10/2003 Shon .................... H05B 6/6458
219/716
2015/0324072 A1* 11/2015 Jung ...................... G08C 17/02
700/83
(Continued)

FOREIGN PATENT DOCUMENTS

JP        2011-011343        1/2011
WO     WO 2011100896 A1 *   8/2011   .............. A47J 27/00

*Primary Examiner* — Sm A Rahman
*Assistant Examiner* — Chen-Liang Huang
(74) *Attorney, Agent, or Firm* — Greenblum & Bernstein, P.L.C.

(57) ABSTRACT

A method for distributing information used by an information distribution system includes receiving, from a cooking appliance, first identification information for identifying a first food, first end time information indicating a first end time, at which a first cooking operation performed by the cooking appliance on the first food ends, and first log information indicating an operation output and an operation time of the first cooking operation, obtaining, on the basis of the received first identification information and first log information, first questionnaire information indicating a questionnaire relating to the first food from a memory, and distributing the first questionnaire information or second questionnaire information, which is generated using the first questionnaire information, to the display device if first additional cooking information indicating that the cooking appliance has performed an additional cooking operation on the first food has not been received from the cooking appliance in a first reception period.

14 Claims, 24 Drawing Sheets

(51) Int. Cl.
*H04L 29/08* (2006.01)
*G09B 7/00* (2006.01)

(58) Field of Classification Search
USPC .......................................................... 709/217
See application file for complete search history.

(56) References Cited

U.S. PATENT DOCUMENTS

2015/0363270 A1* 12/2015 Hammer ................. G06F 16/00
                                                                711/162
2017/0088397 A1*  3/2017 Buckman ................. H04W 4/80
2017/0278117 A1*  9/2017 Wallace ............. G06Q 30/0203

* cited by examiner

FIG. 6

| BARCODE NUMBER | PRODUCT NAME | MANUFACTURER | HEATING SETTING | | |
|---|---|---|---|---|---|
| | | | QUANTITY | OPERATION OUTPUT | OPERATION TIME |
| 49XXXXXXXXXXX | FRIED CHICKEN | YY CORPORATION | 1 | 600 W | 30 sec. |
| 49XXXXXXXXXXX | FRIED CHICKEN | YY CORPORATION | 2 | 600 W | 60 sec. |
| 49XXXXXXXXXXX | FRIED CHICKEN | YY CORPORATION | 1 | 500 W | 40 sec. |

FIG. 7A

| COOKING ID | BARCODE NUMBER | OPERATION START TIME | USER ID | QUANTITY | HEATING SETTING | | ADDITIONAL HEATING |
|---|---|---|---|---|---|---|---|
| | | | | | OPERATION OUTPUT | OPERATION TIME | |
| a0000001 | 491XXXXXXXXXX | 8/1/2015 18:30:47 | user001 | 1 | 600 W | 30 sec. | 0 |
| a0000002 | 491XXXXXXXXXX | 8/1/2015 18:32:00 | user001 | 1 | 600 W | 10 sec. | 1 |
| b0000003 | 492XXXXXXXXXX | 8/1/2015 18:46:30 | user002 | 2 | 600 W | 60 sec. | 0 |
| c0000004 | 493XXXXXXXXXX | 8/1/2015 19:02:02 | user003 | 1 | 500 W | 40 sec. | 0 |
| a0000005 | 491XXXXXXXXXX | 8/8/2015 18:50:50 | user001 | 1 | 600 W | 40 sec. | 0 |

FIG. 7B

| COOKING ID | END TIME |
|---|---|
| a0000001 | 8/1/2015 18:31:17 |
| a0000002 | 8/1/2015 18:32:10 |
| b0000003 | 8/1/2015 18:47:30 |
| c0000004 | 8/1/2015 19:02:42 |

FIG. 8A

| USER ID | MAIL ADDRESS |
|---|---|
| user001 | xxx@example.com |
| user002 | yyy@example.net |
| user002 | zzz@example.org |

FIG. 8B

| BARCODE NUMBER | USER ID | NUMBER OF COOKING OPERATIONS PERFORMED |
|---|---|---|
| 491XXXXXXXXXX | user001 | 2 |
| 492XXXXXXXXXX | user002 | 1 |
| 493XXXXXXXXXX | user002 | 1 |

FIG. 9

| BARCODE NUMBER | QUESTIONNAIRE ID | QUESTIONNAIRE DEFINITION | DISTRIBUTION CONDITION |
|---|---|---|---|
| 491XXXXXXXX | 491XXXXXXXXXX_001 | <h1>POST-COOKING QUESTIONNAIRE ABOUT XX FRIED CHICKEN</h1><br><??><br><ol><li>HOW WAS FOOD HEATED?<ol><br><li>EVENLY HEATED</li><br><li>INSIDE WAS COLD</li><br><li>EVENLY COLD</li><br><li>OTHER</li><br></ol></li></ol> | AFTER COOKING |
| 491XXXXXXXX | 491XXXXXXXXXX_002 | <h1>POST-COOKING QUESTIONNAIRE ABOUT XX FRIED CHICKEN</h1><br><??><br><ol><li>HOW WAS FOOD HEATED AFTER ADDITIONAL HEATING?<br><ol><li>SUFFICIENTLY HEATED</li><br><li>TOO HOT</li><br><li>COLD PART REMAINED</li><br><li>OTHER</li><br></ol></li></ol> | AFTER ADDITIONAL HEATING |
| 491XXXXXXXX | 491XXXXXXXXXX_003 | <h1>PRE-COOKING QUESTIONNAIRE ABOUT XX FRIED CHICKEN</h1><br><??><br><ol><li>WHEN WILL YOU EAT IT?<br><ol><li>BREAKFAST</li><br><li>LUNCH</li><br><li>DINNER</li><br><li>BOX LUNCH</li><br><li>OTHER</li><br></ol></li></ol> | DURING COOKING |

FIG.10

| COOKING ID | QUESTIONNAIRE DEFINITION (AFTER MODIFICATION) | USER ID |
|---|---|---|
| a0000001 | <h1>POST-COOKING QUESTIONNAIRE ABOUT XX FRIED CHICKEN</h1><br><p>YOU COOKED A PIECE BY 600 W AT 18:30:47 ON 8/1/2015 FOR 30 SECONDS. ADDITIONAL HEATING WAS PERFORMED FOR 10 SECONDS.<br></p><br>.... | user01 |

FIG. 11A

POST-COOKING QUESTIONNAIRE
ABOUT XX FRIED CHICKEN

QUESTION 1: HOW WAS FOOD
HEATED?

☐EVENLY HEATED
☐INSIDE WAS COLD
☐EVENLY COLD
☐OTHER (          )

TRANSMIT

FIG. 11B

POST-COOKING QUESTIONNAIRE
ABOUT XX FRIED CHICKEN

YOU COOKED A PIECE BY 600 W
AT 18:30:47 ON 8/1/2015 FOR
30 SECONDS.
ADDITIONAL HEATING WAS
PERFORMED FOR 10 SECONDS.

QUESTION 1: HOW WAS FOOD
HEATED?

☐EVENLY HEATED
☐INSIDE WAS COLD
☐EVENLY COLD
☐OTHER (          )

TRANSMIT

FIG. 12

POST-COOKING QUESTIONNAIRE ABOUT XX FRIED CHICKEN

QUESTION 1: HOW WAS FOOD HEATED AFTER ADDITIONAL HEATING?
☐ SUFFICIENTLY HEATED
☐ TOO HOT
☐ COLD PART REMAINED
☐ OTHER (          )

[TRANSMIT]

FIG. 13

PRE-COOKING QUESTIONNAIRE ABOUT XX FRIED CHICKEN

QUESTION 1: WHEN WILL YOU EAT IT?

☐ BREAKFAST
☐ LUNCH
☐ DINNER
☐ BOX LUNCH
☐ OTHER (          )

[TRANSMIT]

FIG. 14

PRE-COOKING QUESTIONNAIRE
ABOUT XX FRIED CHICKEN

QUESTION 1: WHEN WILL YOU
EAT IT?

☐ BREAKFAST
☐ LUNCH
☐ DINNER
☐ BOX LUNCH
☐ OTHER (         )

POST-COOKING QUESTIONNAIRE
ABOUT XX FRIED CHICKEN

QUESTION 1: HOW WAS FOOD
HEATED?

☐ EVENLY HEATED
☐ INSIDE WAS COLD
☐ EVENLY COLD
☐ OTHER (         )

[ TRANSMIT ]

METHOD FOR DISTRIBUTING INFORMATION, SERVER APPARATUS, AND NETWORK SYSTEM

BACKGROUND

1. Technical Field

The present disclosure relates to a method for distributing information, a server apparatus, and a network system for providing a questionnaire.

2. Description of the Related Art

Systems that distribute questionnaires when users have used certain products have been proposed. In Japanese Patent No. 5347766, a technique for distributing a questionnaire relating to a certain application to a user when the user has performed printing using the certain application is disclosed.

SUMMARY

In one general aspect, the techniques disclosed here feature a method for distributing information used by an information distribution system connected to a display device and a cooking appliance through a network. The method includes receiving, from the cooking appliance, first identification information for identifying a first food, first end time information indicating a first end time, at which a first cooking operation performed by the cooking appliance on the first food ends, and first log information indicating an operation output and an operation time of the first cooking operation performed by the cooking appliance, obtaining, on the basis of the received first identification information and first log information, first questionnaire information indicating a questionnaire relating to the first food from a memory, and distributing the first questionnaire information or second questionnaire information, which is generated using the first questionnaire information, to the display device if first additional cooking information indicating that the cooking appliance has performed an additional cooking operation on the first food has not been received from the cooking appliance in a first reception period, which lasts a first certain period of time from the first end time.

According to the above aspect, improvements can be made.

It should be noted that general or specific embodiments may be implemented as a server apparatus, a system, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of food information according to the embodiment;

FIG. 7A is a diagram illustrating an example of log information recorded when an operation starts according to the embodiment;

FIG. 7B is a diagram illustrating an example of log information recorded when the operation ends according to the embodiment;

FIG. 8A is a diagram illustrating an example of user information according to the embodiment;

FIG. 8B is a diagram illustrating another example of the user information according to the embodiment;

FIG. 9 is a diagram illustrating an example of questionnaire information according to the embodiment;

FIG. 10 is a diagram illustrating an example of transmission waiting questionnaire information according to the embodiment of the present disclosure;

FIG. 11A is a diagram illustrating an example of a questionnaire according to the embodiment of the present disclosure;

FIG. 11B is a diagram illustrating an example of a modified questionnaire according to the embodiment of the present disclosure;

FIG. 12 is a diagram illustrating another example of the questionnaire according to the embodiment of the present disclosure;

FIG. 13 is a diagram illustrating another example of the questionnaire according to the embodiment of the present disclosure;

FIG. 14 is a diagram illustrating an example in which two questionnaire are combined with each other according to the embodiment of the present disclosure;

DETAILED DESCRIPTION

Figure 1:
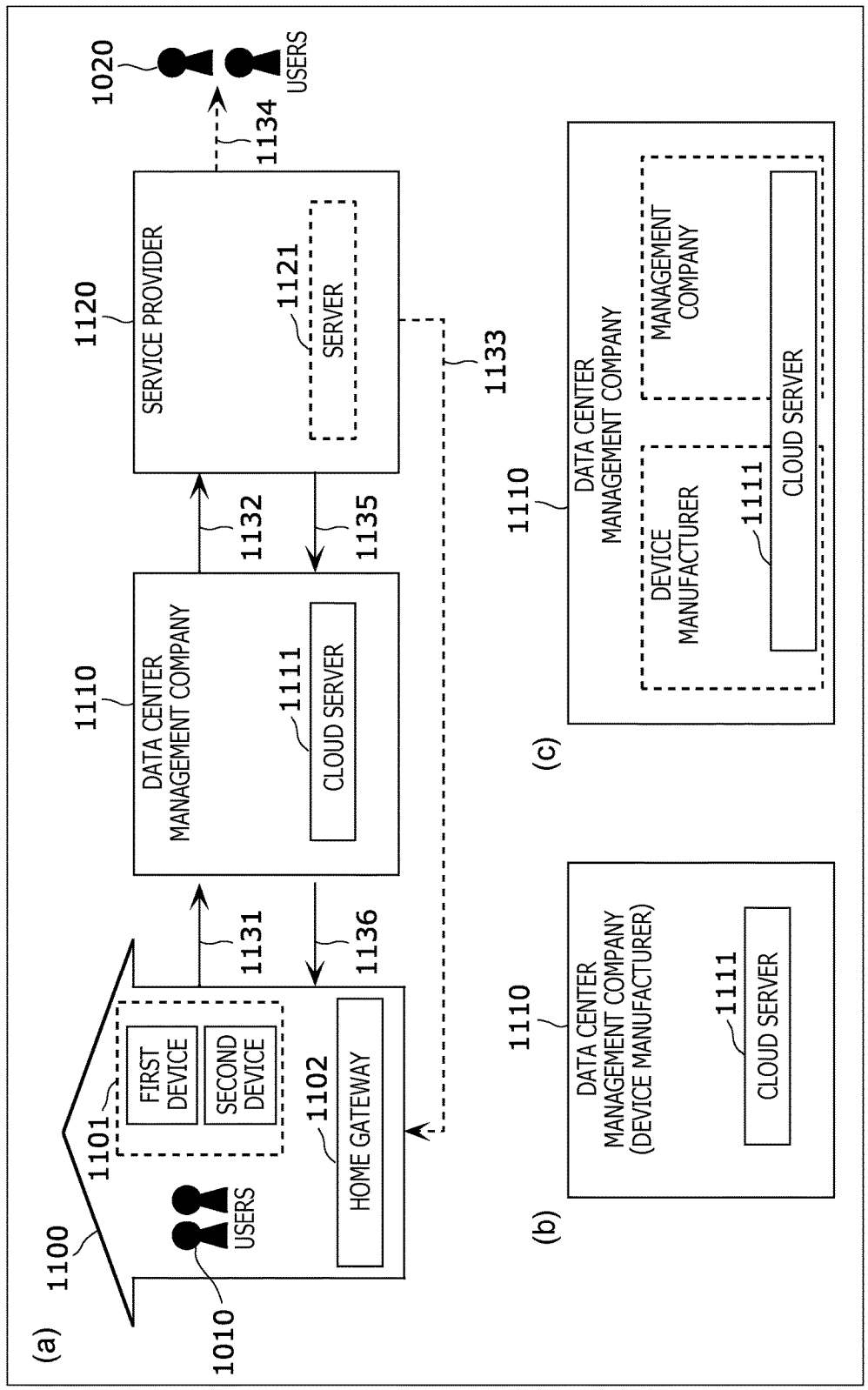
FIG. 1 is a diagram illustrating a network system according to an embodiment.

Underlying Knowledge Forming Basis of the Present Disclosure

The present inventor has found that the following problem arises from the system described in the example of the related art.

Since a questionnaire is distributed when a user has performed printing using a certain application, the questionnaire might be distributed while the user is using the application. That is, improvements need to be made in order to distribute a questionnaire when it is convenient for the user to respond.

In addition, in the case of a questionnaire relating to a food, it might be difficult for the user to respond to the questionnaire accurately if it takes time to distribute the questionnaire after the user eats the food. The timing at which the questionnaire is distributed, therefore, needs to be carefully determined.

As described above, in Japanese Patent No. 5347766, a questionnaire is distributed to a user in order to collect an impression on a product that the user has used. In order for the user to respond to the questionnaire accurately, it is desirable to distribute the questionnaire immediately after the user uses a target product and when the user can respond to the questionnaire. In examples of the related art such as Japanese Patent No. 5347766, however, a technical solution for identifying when the user has used a product and when the user can respond to a questionnaire has not been examined.

That is, in Japanese Patent No. 5347766, improvements need to be made.

A method for distributing information according to an aspect of the present disclosure is a method for distributing information used by an information distribution system connected to a display device and a cooking appliance through a network. The method includes receiving, from the cooking appliance, first identification information for identifying a first food, first end time information indicating a first end time, at which a first cooking operation performed by the cooking appliance on the first food ends, and first log information indicating an operation output and an operation time of the first cooking operation performed by the cooking appliance, obtaining, on the basis of the received first identification information and first log information, first questionnaire information indicating a questionnaire relating to the first food from a memory, and distributing the first questionnaire information or second questionnaire information, which is generated using the first questionnaire information, to the display device if first additional cooking information indicating that the cooking appliance has performed an additional cooking operation on the first food has not been received from the cooking appliance in a first reception period, which lasts a first certain period of time from the first end time.

In this case, the first questionnaire information is distributed to the display device if the first additional cooking information is not received in the first reception period, which lasts the first certain period of time from the end of the first cooking operation. As a result, the first questionnaire information can be distributed at a timing other than while the user is performing the additional cooking operation. The first questionnaire information relating to the first food, therefore, can be distributed when it is convenient for the user to respond. As a result, the same questionnaire information is not repeatedly distributed to receive a response from the user, and a processing load and a load upon the network can be reduced. Power consumption can also be reduced.

In addition, the first questionnaire information or the second questionnaire information may be distributed to the display device a second certain period of time after an end of the first reception period.

In this case, the first questionnaire information can be distributed at a timing other than a period immediately after the first cooking operation in which the user is assumed to be eating the first food. As a result, the first questionnaire information relating to the first food can be distributed to the user who is assumed to have just eaten the first food. That is, the first questionnaire information can be distributed while the user's memory about the first food is still fresh. The first questionnaire information relating to the first food, therefore, can be distributed when it is convenient for the user to respond.

In addition, the first additional cooking information may include second end time information indicating a second end time, at which the additional cooking operation performed by the cooking appliance ends, and second log information indicating an operation output and an operation time of the additional cooking operation performed by the cooking appliance. The method may further include obtaining, if the first additional cooking information is received in the first reception period, third questionnaire information indicating a questionnaire relating to the first food from the memory on the basis of the first identification information, the first log information, and the second log information and distributing the third questionnaire information to the display device if second additional cooking information indicating that the cooking appliance has performed another additional cooking operation on the first food is not received in a second reception period, which lasts a third certain period of time from the second end time.

In this case, the third questionnaire information relating to the first food can be distributed at a timing other than a period after the additional cooking operation in which the user is performing another additional cooking operation. As a result, the third questionnaire information relating to the first food can be distributed when it is convenient for the user to respond.

In addition, the method may further include generating, if the obtained first questionnaire information includes a question asking about information indicated by the first log information, fourth questionnaire information by inputting an answer to the question on the basis of the first log information and distributing, if the first additional cooking information indicating that the cooking appliance has performed the additional cooking operation on the first food is not received from the cooking appliance in the first reception period, which lasts the first certain period of time from the first end time, the fourth questionnaire information to the display device as the second questionnaire information.

In this case, the fourth questionnaire information can be generated in accordance with the first questionnaire information and the first log information. As a result, questionnaire information that suits a situation can be distributed.

In addition, the method may further include obtaining fifth questionnaire information indicating a questionnaire including a question relating to the first food from the memory on the basis of the first identification information and the first log information and distributing the fifth questionnaire information to the display device before the first end time. The question relating to the first food included in the questionnaire indicated by the fifth questionnaire information may be different from a question asking about an impression on the first food that a user has eaten.

In this case, questionnaire information that asks about a topic other than an impression on the first food that the user has eaten can be distributed even before the cooking operation ends.

In addition, the method may further include generating, if questionnaire response information indicating a response to the fifth questionnaire information is not received from the cooking appliance before the first questionnaire information is distributed, sixth questionnaire information including the questionnaire indicated by the first questionnaire information, the question included in the questionnaire indicated by the fifth questionnaire information, and the question asking about an impression on the first food that the user has eaten and distributing, if the first additional cooking information indicating that the cooking appliance has performed the additional cooking operation on the first food is not received from the cooking appliance in the first reception period, which lasts the first certain period of time from the first end time, the sixth questionnaire information to the display device as the second questionnaire information.

In this case, even if there has been no response to a questionnaire distributed before the end of the cooking operation, the questionnaire can be included in the questionnaire asking about an impression on the first food that the user has eaten and distributed. As a result, the questionnaire to which there has been no response and the questionnaire asking about an impression on the first food that the user has eaten, therefore, can be combined with each other as questionnaire information and distributed without distributing only questionnaire information regarding the questionnaire to which there has been no response again.

In addition, the display device may be included in an information terminal connected to the information distribution system through the network. The cooking appliance may communicate with the information distribution system through the information terminal.

In this case, even if the cooking appliance does not have a function of constantly connecting to the Internet, questionnaire information can be appropriately distributed insofar as the cooking appliance has a function of communicating with the terminal device.

In addition, in the distributing the first questionnaire information or the second questionnaire information, if new start information indicating that the cooking appliance has started a second cooking operation on a second food is not received in a new reception period, which lasts a fourth certain period of time, which is longer than the first certain period of time, from the first end time, and if the first additional cooking information is not received in the first reception period, the first questionnaire information or the second questionnaire information may be distributed to the display device.

In this case, the first questionnaire information relating to the first food can be distributed at a timing other than a period after the additional cooking operation in which the user is performing the second cooking operation on the second food. As a result, the first questionnaire information relating to the first food can be distributed when it is convenient for the user to respond.

In addition, the new start information may include second identification information for identifying the second food, third end time information indicating a third end time, at which the second cooking operation ends, and third log information indicating an operation output and an operation time of the second cooking operation performed by the cooking appliance.

In addition, the first food and the second food may be different from each other.

In addition, the first food and the second food may be the same.

In addition, the information distribution system may include a database that stores operation history information including information indicating a history of times at which the cooking appliance has operated. In the distributing the first questionnaire information or the second questionnaire information, the first questionnaire information or the second questionnaire information may be distributed to the display device on the basis of the operation history information in a period in which the cooking appliance is assumed to be not operating.

In this case, since the first questionnaire information can be distributed on the basis of the operation history information in a period in which the cooking appliance is assumed to be not operating, the first questionnaire information can be distributed when it is convenient for the user to respond.

In addition, the operation history information may further include information indicating a day in which the cooking appliance has operated. In the distributing the first questionnaire information or the second questionnaire information, the first questionnaire information or the second questionnaire information may be distributed to the display device on the basis of the operation history information in the day in which the first cooking operation has been performed in a period in which the cooking appliance is assumed to be not operating.

In this case, since the first questionnaire information can be distributed on the basis of the operation history information in a day in which the first cooking operation has been performed in a period in which the cooking appliance is assumed to be not operating, the first questionnaire information can be distributed when it is convenient for the user to respond.

These general or specific embodiments may be implemented as a server apparatus, a system, an integrated circuit, a computer program, a computer-readable storage medium such as a CD-ROM, or any selective combination thereof.

An embodiment and modifications that will be described hereinafter are specific examples of the present disclosure. Values, shapes, components, steps, the order of the steps, and the like described in the following embodiment and modifications are examples, and do not limit the present disclosure. Among the components described in the following embodiment and modifications, ones not described in the independent claims, which define broadest concepts, will be described as arbitrary components. The embodiment and the modifications may be combined with one another.

Outline of Service

First, an outline of a service provided by a network system according to an embodiment will be described.

FIG. 1 is a diagram illustrating a network system according to the present embodiment. More specifically, FIG. 1(a) is a diagram illustrating the outline of a service provided by the network system. The network system includes a group 1100, a data center management company 1110, and a service provider 1120.

The group 1100 is a company, an organization, a household, or the like of any magnitude. The group 1100 includes a plurality of devices 1101 including a first device and a second device and a home gateway 1102. The plurality of devices 1101 include a device connectable to the Internet (e.g., a smartphone, a personal computer (PC), a television set, or the like) and a device that cannot connect to the Internet by itself (e.g., a light, a washing machine, a refrigerator, or the like). The plurality of devices 1101 may include a device that cannot connect to the Internet by itself but that is connectable to the Internet through the home gateway 1102. Users 1010 use the plurality of devices 1101 in the group 1100.

The data center management company 1110 includes a cloud server 1111. The cloud server 1111 is a virtual server that cooperates with various devices through the Internet. The cloud server 1111 mainly manages big data or the like hard to manage with an ordinary database management tool or the like. The data center management company 1110 operates a data center that manages data and the cloud server 1111. Details of the operation of the data center management company 1110 will be described later.

The data center management company 1110 is not limited to a company that manages only data or the cloud server 1111. As illustrated in FIG. 1(*b*), for example, if a device manufacturer that develops or manufactures one of the plurality of devices 1101 manages data or the cloud server 1111, the device manufacturer is the data center management company 1110. In addition, the number of data center management companies 1110 need not be one. As illustrated in FIG. 1(*c*), for example, if a device manufacturer and a management company jointly or separately manage data or the cloud server 1111, the device manufacturer and/or the management company are data center management companies 1110.

The service provider 1120 includes a server 1121. The server 1121 may be of any magnitude and, for example, a memory of a PC owned by an individual or the like. The service provider 1120 might not include the server 1121.

In the network system, the home gateway 1102 is not a mandatory component. If the cloud server 1111 manages all data, for example, the home gateway 1102 need not be used. In addition, a device that cannot connect to the Internet by itself might not exist, as in a case where all devices in a household are connected to the Internet.

Next, transmission of information in the network system will be described.

First, the first device and the second device of the group 1100 transmit log information to the cloud server 1111 of the data center management company 1110. The cloud server 1111 accumulates the log information transmitted from the first device and the second device (an arrow 1131 illustrated in FIG. 1(*a*)). The log information indicates, for example, operation states or operation times of the plurality of devices 1101. The log information includes a television watching history, recorder reservation information, washing machine operation times, the amount of laundry, refrigerator open/close times, the number of times that a refrigerator has been opened and closed, and/or the like but is not limited to these. The log information may include various pieces of information obtained from various devices. The plurality of devices 1101 may directly provide the log information for the cloud server 1111 through the Internet. Alternatively, the plurality of devices 1101 may temporarily accumulate the log information in the home gateway 1102, and the home gateway 1102 may provide the log information for the cloud server 1111.

Next, the cloud server 1111 of the data center management company 1110 provides the accumulated log information for the service provider 1120 in certain units. The certain units may be units in which the data center management company 1110 can sort out the accumulated information and provide the information for the service provider 1120 or may be units requested by the service provider 1120. The certain units may vary depending on a situation. The log information is saved to the server 1121 of the service provider 1120 as necessary (an arrow 1132 illustrated in FIG. 1(*a*)).

The service provider 1120 then rearranges the log information as information that suits a service to be provided for a user and provides the information for the user. The user for which the information is provided may be one of the users 1010 who use the plurality of devices 1101 or may be one of external users 1020. The information may be directly provided for one of the users 1010 and 1020 from the service provider 1120 (arrows 1133 and 1134 illustrated in FIG. 1(*a*)). Alternatively, the information may be provided for one of the users 1010 using the cloud server 1111 of the data center management company 1110 again (arrows 1135 and 1136 illustrated in FIG. 1(*a*)). Alternatively, the cloud server 1111 of the data center management company 1110 may rearrange the log information as information that suits the service to be provided for the user and provide the information for the service provider 1120.

The users 1010 may or may not be the users 1020.

Embodiment

Configuration of Network System

Figure 2:
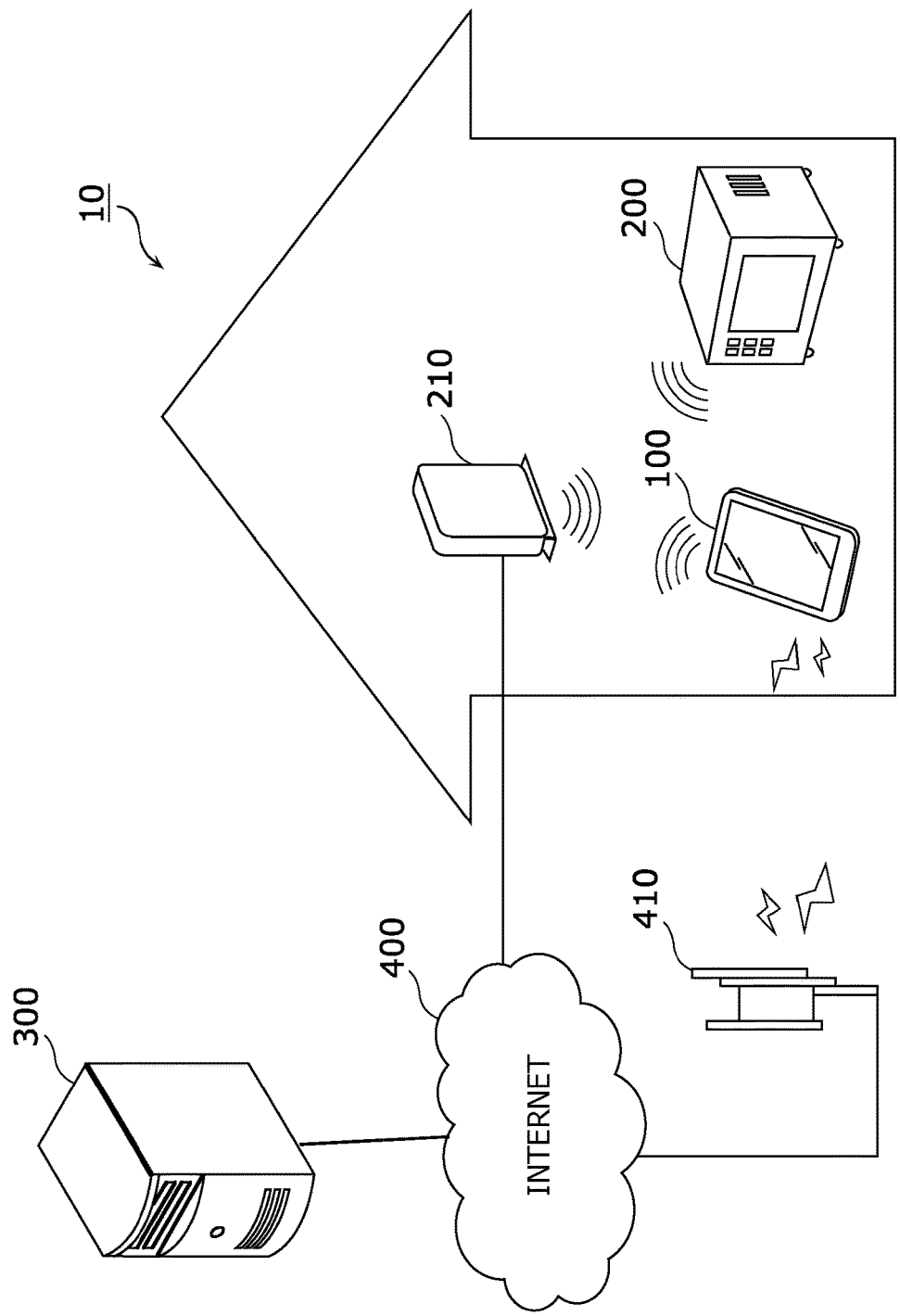
FIG. 2 is a schematic diagram illustrating the configuration of the network system according to the embodiment.

FIG. 2 is a schematic diagram illustrating the configuration of the network system according to the present embodiment.

As illustrated in FIG. 2, a network system 10 according to the present embodiment includes a terminal device 100 corresponding to an information terminal that provides recommended cooking programs (cooking settings) for a user, a microwave oven 200, which is a cooking appliance, and a server apparatus 300 (information distribution system) that holds the recommended cooking programs. In FIG. 2, the terminal device 100 may be connected to the Internet 400 through a wireless local area network (LAN) access point (AP) 210 for establishing a wireless connection, such as Wi-Fi (registered trademark), or a base station 410 included in a mobile phone communication network. The microwave oven 200 may be connected to the Internet 400 through the wireless LAN AP 210, Bluetooth (registered trademark), or a wired LAN. These methods for connecting the terminal device 100 and the microwave oven 200 to the Internet 400 are examples, and other connection methods may be used, instead.

The terminal device 100 and the microwave oven 200 illustrated in FIG. 2 correspond to the plurality of devices 1101 connectable to the Internet illustrated in FIG. 1, and the server apparatus 300 corresponds to the cloud server 1111 or the server 1121 illustrated in FIG. 1.

A case in which a microwave function (heating operation) is used as a cooking function of the microwave oven 200 will be described hereinafter. That is, the cooking programs transmitted from the server apparatus 300 to the terminal device 100 include a heating setting (an operation output and an operation time of the heating operation), which is a setting of the microwave function. A cooking function of the microwave oven 200 is not limited to the microwave function. For example, an oven function, a broiler function, a steam function, or the like may be applied as a cooking function of the microwave oven 200, instead.

Next, specific configurations of the terminal device 100, the microwave oven 200, and the server apparatus 300 included in the network system 10 will be described.

Configuration of Terminal Device 100

Figure 3:
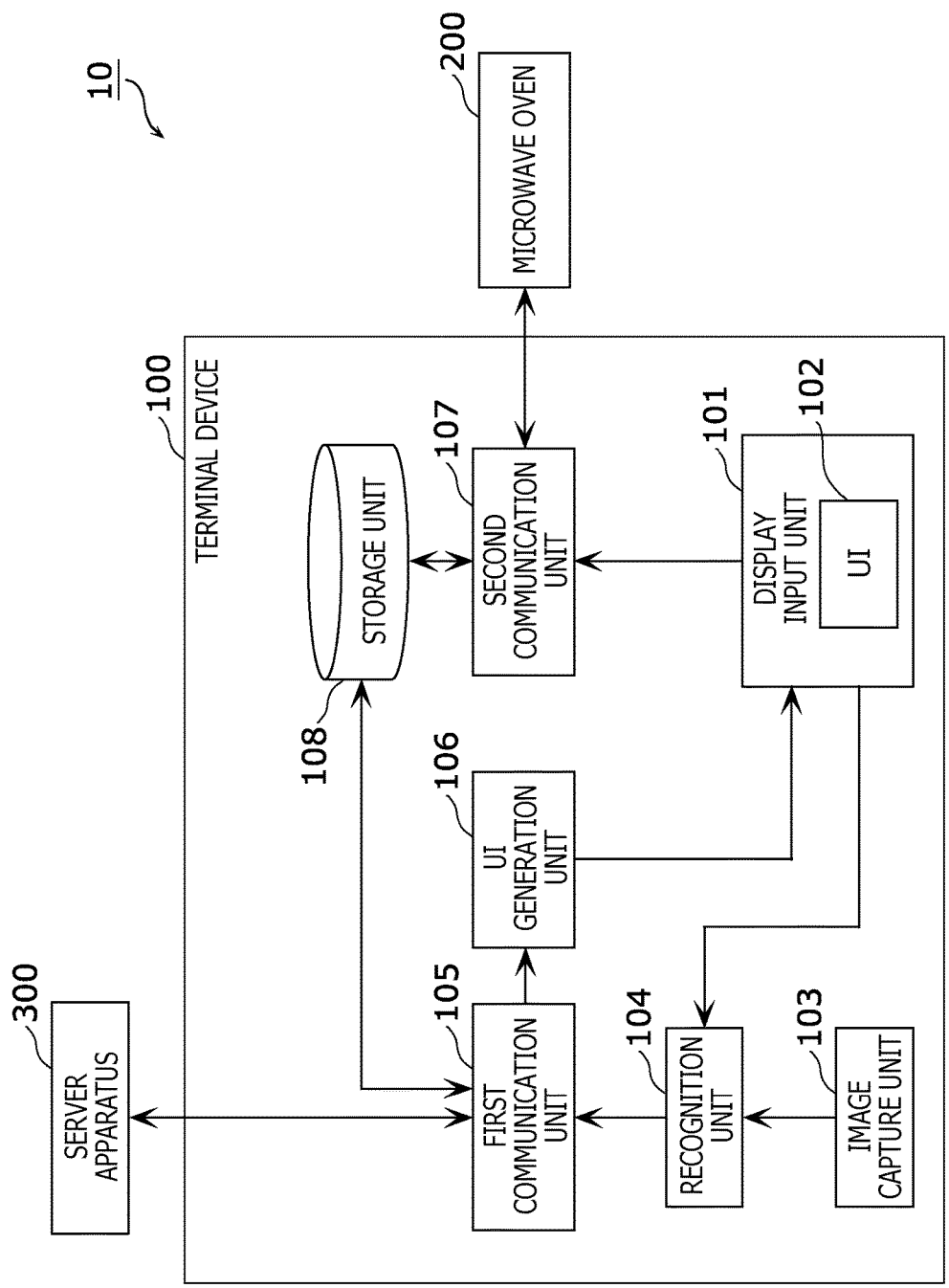
FIG. 3 is a block diagram illustrating a functional configuration of a terminal device included in the network system according to the embodiment.

FIG. 3 is a block diagram illustrating a functional configuration of the terminal device 100 included in the network system 10 according to the present embodiment.

As illustrated in FIG. 3, the terminal device 100 includes a display input unit 101, an image capture unit 103, a recognition unit 104, a first communication unit 105, a user interface (UI) generation unit 106, a second communication unit 107, and a storage unit 108. The terminal device 100 is, for example, a mobile computer such as a smartphone or a tablet. Alternatively, the terminal device 100 may be a computer such as a laptop PC or a desktop PC.

The display input unit 101 displays a UI 102 for presenting information to the user and receiving various operations from the user. More specifically, the display input unit 101 displays, using information (heating setting) transmitted from the server apparatus 300, the UI 102 for allowing the user to select at least one of a plurality of periods of time for which the microwave oven 200 performs a cooking operation. In addition, the display input unit 101 receives a physical operation (e.g., a touch operation on a touch panel) performed by the user, performs one of various processes, and outputs a result of the process to the UI 102 and the recognition unit 104. More specifically, the display input unit 101 notifies the recognition unit 104 that the user has requested activation of a barcode recognition function. In addition, the display input unit 101 outputs, to the second communication unit 107, a heating setting (a heating setting selected by the user) input through the UI 102. The display input unit 101 is achieved by a touch panel or the like.

The image capture unit 103 obtains image data by capturing an image including a food or wrappings of a food and outputs the obtained image data to the recognition unit 104. The image capture unit 103 obtains, for example, image data including a barcode indicated on wrappings of a food. The image capture unit 103 is achieved, for example, by a camera module including an image sensor and a lens.

The recognition unit 104 analyzes image data received from the image capture unit 103 and recognizes identification information for identifying a food whose image has been captured by the image capture unit 103. If receiving image data including a barcode, for example, the recognition unit 104 analyzes image data regarding the barcode and converts the image data into a number (barcode number) corresponding to the barcode, which is the identification information, to recognize the identification information. A known method for analyzing an image may be used to recognize a barcode. The recognition unit 104 then outputs the obtained barcode number to the first communication unit 105. The barcode is an example of information for recognizing a food, and another type of information may be used, instead. For example, the recognition unit 104 may uniquely identify a food by conducting an image analysis such as an image matching process, for example, on the basis of image data obtained by capturing an image of the appearance of the food or wrappings of the food. The recognition unit 104 is achieved, for example, by a processor and a program stored in a memory.

The first communication unit 105 communicates with the server apparatus 300. More specifically, the first communication unit 105 requests, using identification information (e.g., a barcode number) received from the recognition unit 104 as a key, the server apparatus 300 (search unit 301) to transmit food information (that is, food information corresponding to the barcode number) corresponding to the identification information. The first communication unit 105 then receives the food information, which is a response to the request transmitted from the server apparatus 300, and outputs the received food information to the UI generation unit 106. In addition, the first communication unit 105 associates log information (described later) and a user identifier (ID), which is an ID for identifying a user of the microwave oven 200, stored in the storage unit 108 with each other and transmits the log information and the user ID to the server apparatus 300 (a reception unit 302 that will be described later).

The first communication unit 105 is achieved, for example, by a processor, a program stored in a memory, and a communication module (e.g., a Wi-Fi module or a mobile phone communication module). That is, the communication between the terminal device 100 and the server apparatus 300 is performed through the Internet 400.

As illustrated in FIG. 6, each piece of food information includes, for example, a barcode number as identification information, quantity, a standard hearting output (e.g., watts), and a heating time.

The UI generation unit 106 generates the UI 102 using information (e.g., a heating setting) included in food information received from the first communication unit 105. The UI generation unit 106 generates, for example, the UI 102 for allowing the user to select one of heating settings indicated by the food information. The UI generation unit 106 outputs the generated UI 102 to the display input unit 101. The UI generation unit 106 is achieved, for example, by a processor and a program stored in a memory.

The second communication unit 107 transmits a heating setting selected by the user using the UI 102 displayed by the display input unit 101 to the microwave oven 200 (a communication unit 201 that will be described later). As a result, the heating setting selected by the user using the UI 102 is set to the microwave oven 200. A heating setting (cooking setting) includes, for example, a heating operation output (e.g., watts) and a heating operation time.

More specifically, the second communication unit 107 receives, from the microwave oven 200, log information indicating an operation output and an operation time of a heating operation performed by the microwave oven 200. The received log information is saved to the storage unit 108.

The second communication unit 107 is achieved, for example, by a processor, a program stored in a memory, and a communication module (e.g., a near-field communication (NFC) module, a Bluetooth module, or a Wi-Fi module). That is, the communication between the terminal device 100 and the microwave oven 200 is performed through short-distance wireless communication such as NFC, Wi-Fi, Bluetooth, or Zigbee (registered trademark).

The storage unit 108 stores a user ID for identifying a user of the terminal device 100 as a user ID for identifying a user of the microwave oven 200. The storage unit 108 also stores log information received by the second communication unit 107. The storage unit 108 is achieved, for example, by a storage device such as a hard disk drive or a nonvolatile memory.

Configuration of Microwave Oven 200

Figure 4:
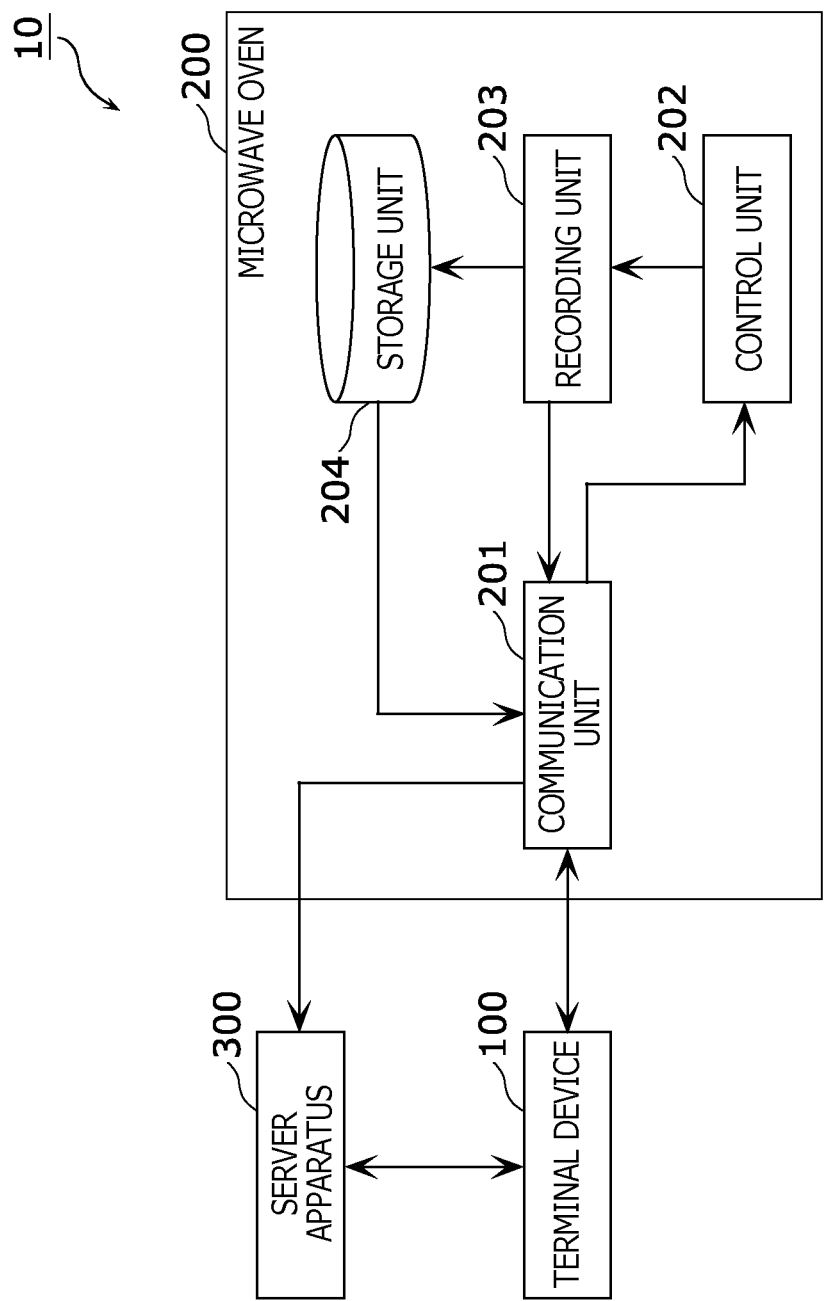
FIG. 4 is a block diagram illustrating a functional configuration of a microwave oven included in the network system according to the embodiment.

FIG. 4 is a block diagram illustrating a functional configuration of the microwave oven 200 included in the network system 10 according to the present embodiment.

As illustrated in FIG. 4, the microwave oven 200 includes the communication unit 201, a control unit 202, a recording unit 203, and a storage unit 204.

In the microwave oven 200, the communication unit 201 receives a heating setting from the terminal device 100 (second communication unit 107). The communication unit 201 notifies the control unit 202 of the received heating setting. In addition, if the recording unit 203 records log information in the storage unit 204, the communication unit 201 transmits the recorded log information to the server apparatus 300 (reception unit 302). The communication unit 201 is achieved, for example, by a processor, a program stored in a memory, a communication module (e.g., an NFC module, a Bluetooth module, or a Wi-Fi module), and the like.

The control unit 202 performs a heating operation in accordance with a heating setting received from the communication unit 201. The control unit 202 is achieved, for example, by components of a common microwave oven, such as a processor, a program stored in a memory, and a magnetron.

The recording unit 203 records an operation start time and an operation end time in the storage unit 204 as log information as well as an operation output and an operation time of a heating operation performed by the control unit 202. In addition, the recording unit 203 notifies the communication unit 201 that the log information has been recorded in the storage unit 204. The recording unit 203 is achieved, for example, by a processor, a program stored in a memory, and the like.

The storage unit 204 stores log information. The log information indicates when and how a heating operation has been performed (an operation output (watts) and time (seconds)). The storage unit 204 is achieved, for example, by a storage device such as a nonvolatile memory.

Configuration of Server Apparatus 300

Figure 5:
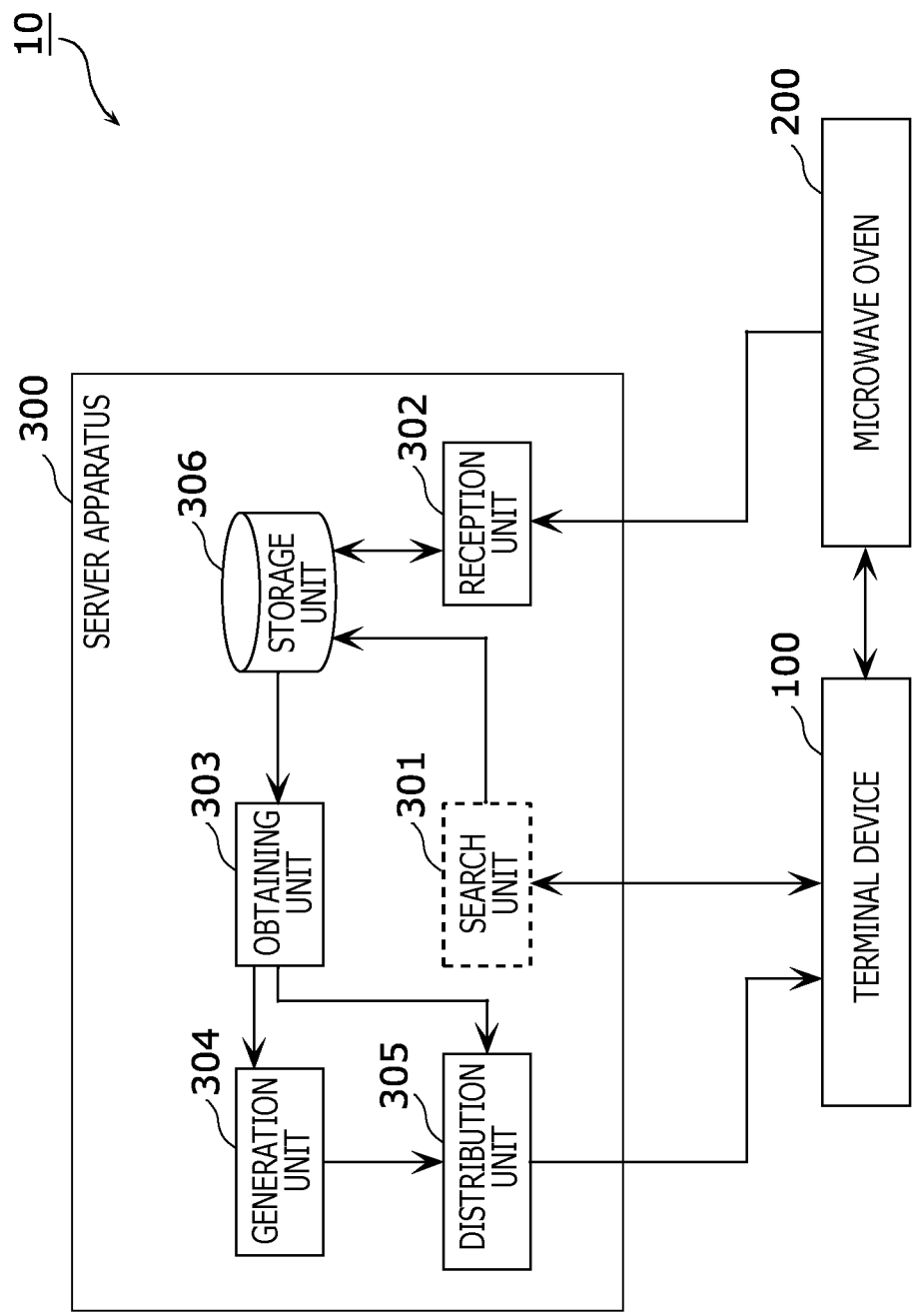
FIG. 5 is a block diagram illustrating the configuration of a server apparatus included in the network system according to the embodiment.

FIG. 5 is a block diagram illustrating the configuration of the server apparatus 300 included in the network system 10 according to the present embodiment.

As illustrated in FIG. 5, the server apparatus 300 includes the search unit 301, the reception unit 302, an obtaining unit 303, a generation unit 304, a distribution unit 305, and a storage unit 306. The number of server apparatuses 300 (information distribution systems) need not be one, and there may be a plurality of server apparatuses 300. The server apparatus 300 may be at least part of an apparatus that achieves cloud computing that provides software, data, and the like through a network such as the Internet.

In the server apparatus 300, the search unit 301 searches a database of food information stored in the storage unit 306 using information (e.g., identification information such as a barcode number) received from the terminal device 100 (first communication unit 105) as a key to obtain food information corresponding to the key. The search unit 301 transmits the obtained food information to the terminal device 100 (first communication unit 105). The search unit 301 is achieved, for example, by a processor, a program stored in a memory, a communication module, and the like.

The reception unit 302 receives log information from the microwave oven 200 (communication unit 201) and stores the received log information in the storage unit 306 as a database. More specifically, the reception unit 302 receives log information including an operation output, an operation time, an operation start time, and an operation end time of a heating operation performed by each of a plurality of microwave ovens 200 on a food and stores the log information managed for each of the plurality of microwave ovens 200 in the storage unit 306. As described later, the log information includes first identification information for identifying a first food, first end time information indicating a first end time, at which a first cooking operation performed by the microwave oven 200 on the first food ends, and first log information indicating an operation output and an operation time of the first cooking operation performed by the microwave oven 200. In addition, the reception unit 302 receives a user's response to a questionnaire from the terminal device 100, for example, and records the user's response in the storage unit 306. The reception unit 302 is achieved, for example, by a communication module.

The obtaining unit 303 obtains first questionnaire information indicating a questionnaire relating to the first food from the storage unit 306 on the basis of the received first identification information and first log information. More specifically, the obtaining unit 303 searches questionnaire information stored in the storage unit 306 using a barcode number obtained from log information received by the reception unit 302 as a key to obtain a questionnaire definition as the first questionnaire information to be distributed. If the questionnaire information stored in the storage unit 306 does not include a questionnaire definition corresponding to the barcode number, the obtaining unit 303 does not obtain the questionnaire definition. The obtaining unit 303 is achieved, for example, by a processor, a program stored in a memory, and the like.

The generation unit 304 may generate second questionnaire information using a questionnaire definition (first questionnaire information) obtained by the obtaining unit 303. The generation unit 304 generates the second questionnaire information, for example, by modifying the first questionnaire information. More specifically, for example, the generation unit 304 generates fourth questionnaire information by modifying a questionnaire definition in accordance with log information as the second questionnaire information. More specifically, if the obtained first questionnaire information includes a question asking about information indicated by the first log information, the generation unit 304 generates the fourth questionnaire information by inputting an answer to the question on the basis of the first log information. For example, the generation unit 304 generates fourth questionnaire information illustrated in FIG. 10 by modifying a questionnaire definition of questionnaire information illustrated in FIG. 9, that is, by replacing a text "<??>" in a questionnaire with a time at which a heating operation has been performed. If a text in a questionnaire definition need not be replaced, the generation unit 304 does not modify the questionnaire definition. In this case, the distribution unit 305 may distribute the obtained first questionnaire information.

If the distribution unit 305 does not receive, in a first reception period, which lasts a first certain period of time from the first end time, first additional cooking information indicating that the microwave oven 200 has performed an additional cooking operation on the first food, the distribution unit 305 begins to distribute the first questionnaire information to the terminal device 100 as a display device. That is, the distribution unit 305 determines whether the first additional cooking information indicating that the microwave oven 200 has performed an additional cooking operation on the first food has been received in the first reception period, which lasts the first certain period of time from the first end time. If the distribution unit 305 does not receive the first additional cooking information indicating that the microwave oven 200 has performed an additional cooking operation on the first food in the first reception period, which lasts the first certain period of time from the first end time, the distribution unit 305 begins to distribute the first questionnaire information to the terminal device 100. For example, the distribution unit 305 begins to distribute the first questionnaire information a second certain period of time after an end of the first reception period.

If the generation unit 304 generates the fourth questionnaire information, the distribution unit 305 distributes the fourth questionnaire information generated by the generation unit 304 as the second questionnaire information instead of the first questionnaire information.

The distribution unit 305 is achieved, for example, by a processor, a program stored in a memory, a communication module, and the like.

The first reception period is, for example, a period that lasts the first certain period of time from the time at which the microwave oven 200 ends a heating operation as a function thereof and in which the user can input an additional cooking operation (additional heating operation). In the first reception period, for example, the microwave oven 200 notifies the user that the user can input an additional heating operation (e.g., a message "additional heating" flashes). That is, since the microwave oven 200 does not receive an additional cooking operation after the first reception period, the server apparatus 300 can estimate that the microwave oven 200 has not performed an additional cooking operation if the first reception period ends and the first additional cooking information is not received.

On the other hand, if the distribution unit 305 receives the first additional cooking information indicating that the microwave oven 200 has performed an additional cooking operation on the first food in the first reception period, which lasts the first certain period of time from the first end time, the server apparatus 300 obtains third questionnaire information and distributes the obtained third questionnaire information to the terminal device 100 (hereinafter referred to as a "process for distributing the third questionnaire information"). The first additional cooking information includes second end time information indicating a second end time, at which the additional cooking operation performed by the microwave oven 200 ends, and second log information indicating an operation output and an operation time of the additional cooking operation performed by the microwave oven 200.

As described above, the process for distributing the third questionnaire information is performed if the reception unit 302 receives the first additional cooking information in the first reception period. In this case, the obtaining unit 303 obtains the third questionnaire information indicating a questionnaire relating to the first food on the basis of the first identification information, the first log information, and the second log information. More specifically, the obtaining unit 303 searches the questionnaire information stored in the storage unit 306 using a barcode number obtained from the first additional cooking information received by the reception unit 302 as a key to obtain a questionnaire definition as the third questionnaire information to be distributed. The third questionnaire information obtained here includes a questionnaire relating to an additional cooking operation performed on the first food.

Next, if the distribution unit 305 does not receive, in a second reception period, which lasts a third certain period of time from the second end time, second additional cooking information indicating that the microwave oven 200 has performed another additional cooking operation on the first food, the distribution unit 305 begins to distribute the third questionnaire information to the terminal device 100 as the display device. That is, the distribution unit 305 determines whether the second additional cooking information indicating that the microwave oven 200 has performed another additional cooking operation on the first food in the second reception period, which lasts the third certain period of time from the second end time. If the distribution unit 305 does not receive the second additional cooking information indicating that the microwave oven 200 has performed another additional cooking operation on the first food in the second reception period, which lasts the third certain period of time from the second end time, the distribution unit 305 distributes the third questionnaire information to the terminal device 100.

The storage unit 306 stores food information, log information, user information, questionnaire information, transmission waiting questionnaire information, and questionnaire response information. The storage unit 306 is achieved, for example, by a storage device such as a hard disk drive or a nonvolatile memory. Although an example in which the server apparatus 300 includes the storage unit 306 will be described, the configuration of the server apparatus 300 is not limited to this. The server apparatus 300 and a storage device corresponding to the storage unit 306 may be physically separate from each other insofar as the server apparatus 300 can access information stored in the storage device.

The food information, log information, user information, questionnaire information, and transmission waiting questionnaire information stored in the storage unit 306 will be described hereinafter with reference to FIGS. 6 to 11B.

FIG. 6 is a diagram illustrating an example of the food information.

As illustrated in FIG. 6, for example, the food information is data in which a barcode number, which is identification information for uniquely identifying a food, a product name of the food (food name), a manufacturer of the food, a heating setting (quantity, a standard operation output, and a standard operation time) for the food according to the quantity, and the like are associated with one another. For example, the food information is separately collected and saved to the storage unit 306.

FIG. 7A is a diagram illustrating an example of log information recorded when an operation starts. FIG. 7B is a diagram illustrating an example of log information recorded when an operation ends.

The log information indicates a user who has performed a heating operation, when the user has performed the heating operation, and how long the heating operation has lasted (an operation output (watts), an operation time (seconds), and the like). As illustrated in FIG. 7A, for example, start log information, which is log information recorded when a heating operation starts, includes a cooking ID, a barcode number, an operation start time (a date and a time), a user ID, a heating setting (quantity, an operation output (watts), and an operation time (seconds)) according to the quantity, and additional cooking information indicating whether an additional heating operation has been performed on the same food. The additional cooking information is a flag indicating "1" when an additional heating operation has been performed and "0" when only an ordinary heating operation has been performed. The operation start time is information indicating a date and a time at which an operation has started, but may be information indicating only a time in a day.

As illustrated in FIG. 7B, for example, end log information, which is log information recorded when a heating operation ends, includes a cooking ID provided in start log information corresponding to the heating operation and an operation end time of the heating operation.

The log information is thus collected when the reception unit 302 receives the log information from the microwave oven 200 and saved in the storage unit 306 in the form of the start log information and the end log information. The log information need not be divided into the start log information and the end log information. A start time and an end time may be associated with the same cooking ID and saved, instead.

FIG. 8A is a diagram illustrating an example of the user information.

As illustrated in FIG. 8A, for example, the user information includes a user ID and a mail address. Although a mail address is associated with a user ID in the user information, the user information may be any kind of information insofar as a user can be uniquely identified and information can be distributed to the user. For this reason, the user information may include only a mail address. Alternatively, the user information may be an ID associated with an application installed on the terminal device 100 owned by a user to which information is to be distributed. That is, the user information may be any kind of information insofar as the server apparatus 300 can identify the terminal device 100 to which the server apparatus 300 transmits information. Alternatively, the user information need not be information for identifying the terminal device 100. For example, the user information may be information for identifying an ID corresponding to a cloud service to which a user is registered. This is because the user can obtain information by logging in the user's account of the cloud service using any terminal.

FIG. 8B is a diagram illustrating another example of the user information.

As illustrated in FIG. 8B, for example, the user information may further include cooking count information, which includes a barcode number, a user ID, and the number of cooking operations performed, as well as the information illustrated in FIG. 8A. The cooking count information indicates how many times a user has performed a cooking operation on a certain food. The cooking count information is used when a questionnaire distribution condition is the number of cooking operations performed.

FIG. 9 is a diagram illustrating an example of the questionnaire information.

As illustrated in FIG. 9, for example, the questionnaire information includes a barcode number of a food, a questionnaire ID, a questionnaire definition, and a distribution condition. The questionnaire definition is information described in hypertext markup language (HTML) and defines a main question of a questionnaire. The distribution condition is information indicating a condition under which the questionnaire is distributed to a user and includes information such as "after the cooking", "during the cooking", "after an additional heating", "after two cooking operations performed by the same user", or the like. The questionnaire information is generated on the basis of a questionnaire request from a food manufacturer and stored in the storage unit 306 as described above.

As illustrated in FIG. 10, for example, the transmission waiting questionnaire information includes a cooking ID, a questionnaire definition (fourth questionnaire information) generated by modifying a questionnaire definition using the generation unit 304, and a user ID of a user to whom a questionnaire is distributed. The transmission waiting questionnaire information may include a questionnaire definition (first questionnaire information) obtained by the obtaining unit 303 instead of a generated questionnaire definition (fourth questionnaire information).

The questionnaire response information includes, for example, a response ID, a response time, a user ID, and a response.

For example, a questionnaire is given as a web application. FIG. 11A is a diagram illustrating an example of a questionnaire definition displayed on a web browser. If a user inputs an answer to a question displayed on the display input unit 101 of the terminal device 100 and selects a "transmit" button, the terminal device 100 transmits questionnaire response information indicating the answer to the question to the server apparatus 300 (reception unit 302). A unique uniform resource locator (URL) is given to each questionnaire, and a user can response to each questionnaire by displaying a URL on a web browser.

As illustrated in FIGS. 12 and 13, for example, the obtaining unit 303 can obtain a different questionnaire definition in accordance with the first log information received by the reception unit 302 and a distribution condition included in questionnaire information stored in the storage unit 306. That is, if the first log information indicates that a cooking operation has ended, the obtaining unit 303 obtains the questionnaire definition whose distribution condition is "after the cooking" illustrated in FIG. 9.

On the other hand, if the first log information indicates that a cooking operation is being performed, the obtaining unit 303 obtains the questionnaire definition whose distribution condition is "during the cooking" illustrated in FIG. 9. That is, if it is determined on the basis of the first identification information and the first log information that the microwave oven 200 is performing a cooking operation, the obtaining unit 303 may obtain fifth questionnaire information indicating a questionnaire (e.g., refer to FIG. 13) that does not include a question asking about an impression on the first food that the user has eaten. The "questionnaire that does not include a question asking about an impression on the first food that the user has eaten" refers to a questionnaire that includes a question asking about when a user eats the first food, where the user eats the first food, whom the user eats the first food with, which food the user eats the first food with, how the user eats the first food, where the user has purchased the first food, or the like. If the obtaining unit 303 obtains the fifth questionnaire information, the distribution unit 305 distributes the fifth questionnaire information to the terminal device 100 as the display device before the first end time.

As illustrated in FIG. 14, for example, the generation unit 304 may combine two or more questionnaire definitions with each other. That is, if the reception unit 302 does not receive, from the microwave oven 200, questionnaire response information indicating a response to the fifth questionnaire information before the first questionnaire information is distributed, the generation unit 304 may generate sixth questionnaire information illustrated in FIG. 14, in which a questionnaire indicated by the first questionnaire information is combined with a question included in a questionnaire indicated by the fifth questionnaire information and a question asking about an impression on the first food that the user has eaten, as the second questionnaire information. The "question asking about an impression on the first food that the user has eaten" refers to a question asking a user whether the first food tasted good, whether the first food was sufficiently heated, or the like. If the generation unit 304 generates the sixth questionnaire information, the distribution unit 305 distributes the sixth questionnaire information as the second questionnaire information instead of the first questionnaire information. Alternatively, the generation unit 304 need not generate the sixth questionnaire information. In this case, the first questionnaire information and the fifth questionnaire information may be transmitted instead of the sixth questionnaire information.

Method for Obtaining Heating Setting

Next, a method for obtaining a heating setting used by the terminal device 100 illustrated in FIG. 3 will be described.

Figure 15:
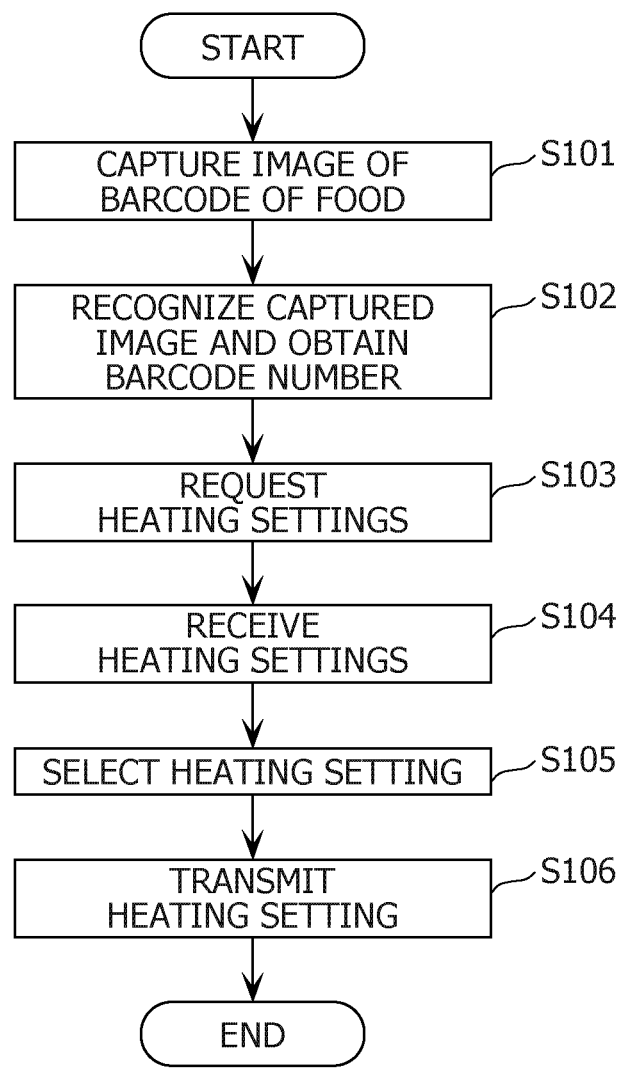
FIG. 15 is a flowchart illustrating a method for obtaining a heating setting used by the terminal device.

FIG. 15 is a flowchart illustrating the method for obtaining a heating setting used by the terminal device 100.

A processing flow illustrated in FIG. 15 starts, for example, when the user has activated, using the terminal device 100, an application having a function of recognizing a barcode of a food.

In the method for obtaining a heating setting, first, the user captures an image of a barcode of a food using the image capture unit 103 of the terminal device 100 (S101).

Next, the recognition unit 104 performs image recognition on image data (captured image) regarding the barcode whose image has been captured in step S101 and obtains a barcode number (S102).

Next, the first communication unit 105 uploads the barcode number obtained in step S102 in order to request heating settings from the server apparatus 300 (S103).

Next, the first communication unit 105 receives the heating settings from the server apparatus 300 as a result of the request made in step S103 (S104).

Next, the UI generation unit 106 generates the UI 102 for allowing the user to select one of the heating settings received by the first communication unit 105 in step S104, and the user selects one of the heating settings on the UI 102 (S105).

Next, the second communication unit 107 transmits the selected heating setting to the microwave oven 200 (S106). The heating setting is thus set to the microwave oven 200.

Method for Transmitting Questionnaire Information

Next, a process for transmitting questionnaire information to the user performed by the server apparatus 300 illustrated in FIG. 5 will be described.

Figure 16:
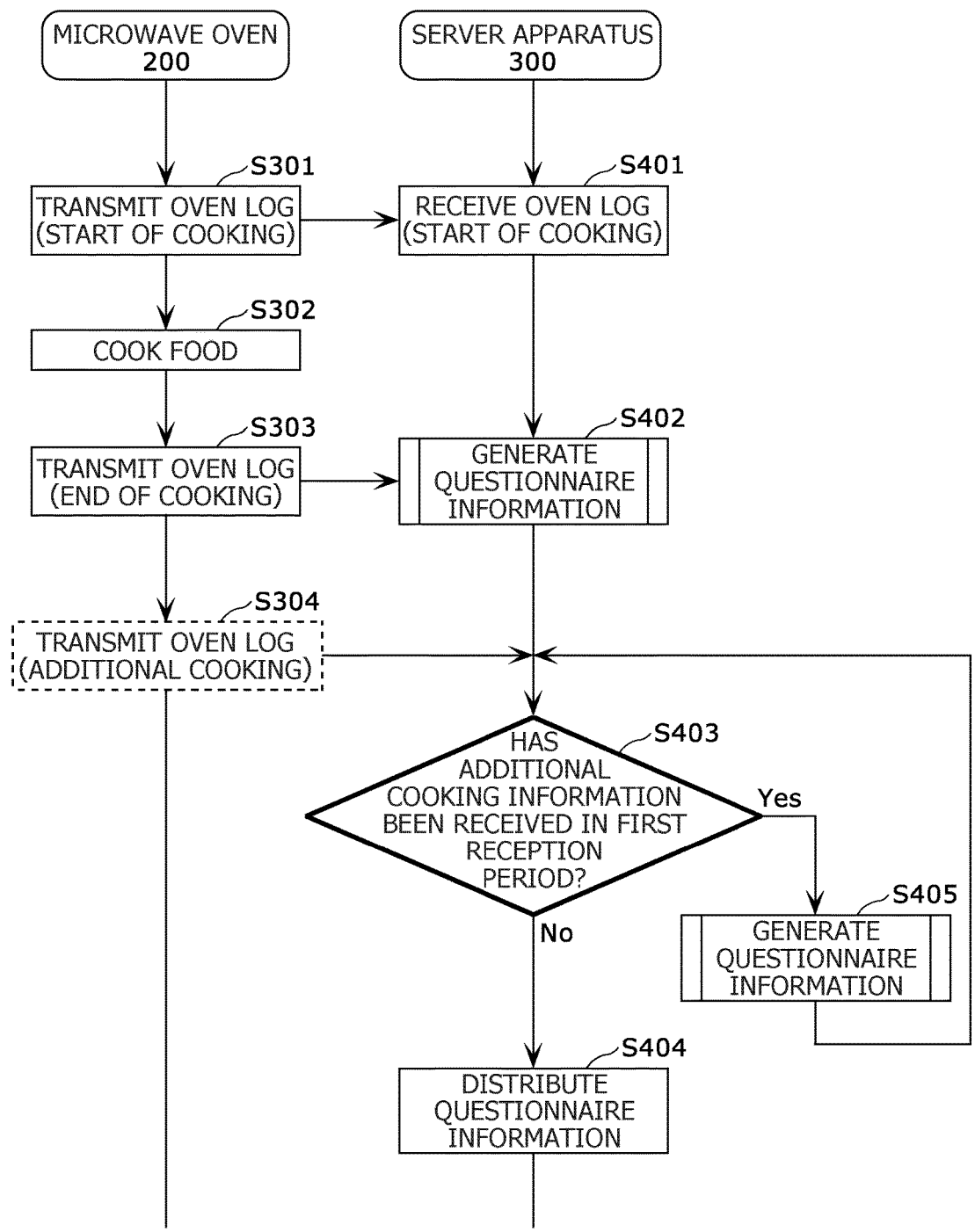
FIG. 16 is a sequence diagram illustrating an example of a process for transmitting a questionnaire to the microwave oven from the server apparatus.

FIG. 16 is a sequence diagram illustrating an example of the process for transmitting questionnaire information to the microwave oven 200 from the server apparatus 300.

In a method for transmitting questionnaire information, first, the communication unit 201 of the microwave oven 200 transmits oven log (log information) indicating a start of a cooking operation to the server apparatus 300 (S301).

The control unit 202 of the microwave oven 200 performs the cooking operation on a food (S302).

The reception unit 302 of the server apparatus 300 receives the oven log (log information) indicating the start of the cooking operation transmitted from the microwave oven 200 (S401).

The server apparatus 300 begins to generate questionnaire information (S402). A specific process for generating questionnaire information will be described later.

After the cooking operation performed in step S302 ends, the communication unit 201 of the microwave oven 200 transmits oven log (log information) indicating an end of the cooking operation to the server apparatus 300 (S303). Although, in FIG. 17, the communication unit 201 transmits the oven log (log information) indicating the end of the cooking operation to the server apparatus 300 when the questionnaire information is generated, the communication unit 201 may transmit the oven log before or after step S402, instead.

Next, the distribution unit 305 of the server apparatus 300 determines whether the reception unit 302 has received additional cooking information in the first reception period (S403).

If the distribution unit 305 determines that the reception unit 302 has not received additional cooking information in the first reception period (No in S403), distributes the generated questionnaire information (S404). More specifically, the server apparatus 300 distributes the questionnaire information the second certain period of time after the end of the first reception period.

On the other hand, if the distribution unit 305 determines that the reception unit 302 has received additional cooking information in the first reception period (YES in S403), the server apparatus 300 generates the third questionnaire information (S405). A specific process for generating the third questionnaire information will be described later.

If an additional cooking operation is performed, the communication unit 201 of the microwave oven 200 transmits oven log (log information) indicating the additional cooking operation to the server apparatus 300 (S304).

Next, the specific process for generating questionnaire information will be described.

Figure 17:
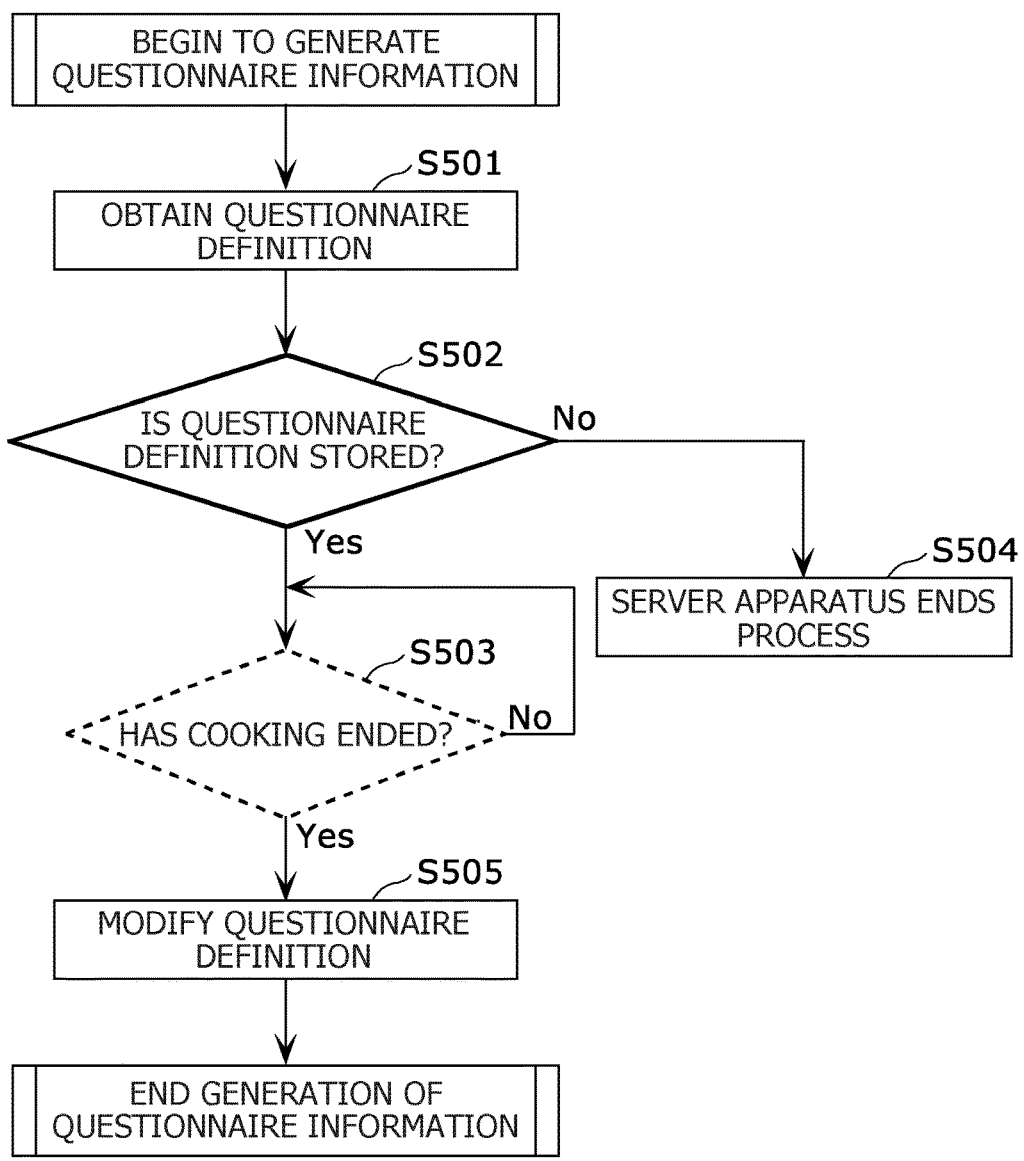
FIG. 17 is a flowchart illustrating a specific process for generating a questionnaire.

FIG. 17 is a flowchart illustrating the specific process for generating questionnaire information.

First, when the server apparatus 300 begins to generate questionnaire information, the obtaining unit 303 attempts to obtain, on the basis of received identification information and log information, a questionnaire definition indicating a questionnaire relating to a food identified by the identification information from the storage unit 306 (S501).

Next, the obtaining unit 303 determines, on the basis of the log information, whether the storage unit 306 stores a questionnaire definition relating to the food (S502).

If the obtaining unit 303 determines, on the basis of the log information, that the storage unit 306 stores a questionnaire definition relating to the food (YES in S502), the generation unit 304 determines whether the cooking operation has ended (S503). More specifically, the generation unit 304 determines whether the reception unit 302 has received the oven log (log information) indicating the end of the cooking operation. If the reception unit 302 has received the oven log, the generation unit 304 determines that the cooking operation has ended, and if the reception unit 302 has not received the oven log, the generation unit 304 determines that the cooking operation has not ended (is being performed).

If determining that the cooking operation has ended (YES in S503), the generation unit 304 generates the fourth questionnaire information by modifying the questionnaire definition obtained by the obtaining unit 303 (S505) and ends the generation of questionnaire information. On the other hand, if determining that the cooking operation has not ended (NO in S503), the generation unit 304 waits until the cooking operation ends.

If the obtaining unit 303 determines in S502 that the storage unit 306 does not store a questionnaire definition relating to the food (NO in S502), the server apparatus 300 ends the process for distributing a questionnaire (S504).

The third questionnaire information can be generated by performing the process illustrated in FIG. 17 on the basis of log information regarding an additional cooking operation. Because the third questionnaire information may be generated without identifying when the additional cooking operation ends, the processing in step S503 may be omitted.

Advantageous Effects

According to the present embodiment, if the first additional cooking information is not received in the first reception period, which lasts the first certain period of time from the end of the first cooking operation, the first questionnaire information is distributed to the terminal device 100. The first questionnaire information, therefore, can be distributed at a timing other than while the user is performing the additional cooking operation. As a result, the first questionnaire information relating to the first food can be distributed when it is convenient for the user to respond. The same questionnaire information is not repeatedly distributed to receive a response from the user, and a processing load and a load upon the network can be reduced. Power consumption can also be reduced.

In addition, according to the present embodiment, the first questionnaire information can be distributed at a timing other than a period immediately after the first cooking operation in which the user is assumed to be eating the first food. As a result, the first questionnaire information relating to the first food can be distributed to the user who is assumed to have just eaten the first food. That is, the first questionnaire information can be distributed while the user's memory about the first food is still fresh. The first questionnaire information relating to the first food, therefore, can be distributed when it is convenient for the user to respond.

In addition, according to the present embodiment, whether the additional cooking information is received in the first reception period is determined again even after the third questionnaire information is generated, the third questionnaire information relating to the first food can be distributed at a timing other than while the user is performing another additional cooking operation after the first additional cooking operation. As a result, the third questionnaire information relating to the first food can be distributed when it is convenient for the user to respond.

In addition, according to the present embodiment, the fourth questionnaire information can be generated in accordance with the first questionnaire information and the first log information. As a result, questionnaire information that suits a situation can be distributed.

In addition, according to the present embodiment, questionnaire information asking about an impression on the first food that the user has eaten can be distributed even before a cooking operation ends.

In addition, according to the present embodiment, even if there is no response to a questionnaire distributed before the cooking operation ends, the questionnaire to which there has been no response can be included in a questionnaire asking about an impression on the first food that the user has eaten and distributed. The questionnaire to which there has been no response and the questionnaire asking about an impression on the first food that the user has eaten, therefore, can be combined with each other as questionnaire information and distributed without distributing only questionnaire information regarding the questionnaire to which there has been no response again.

In addition, according to the present embodiment, even if the microwave oven 200 does not have a function of constantly connecting to the Internet, questionnaire information can be appropriately distributed insofar as the microwave oven 200 has a function of communicating with the terminal device 100.

First Modification

Although a process for distributing questionnaire information relating to the first cooking operation performed on the first food has been described in the above embodiment, a second cooking operation might be performed on a second food after the first cooking operation. This case will be described with reference to FIG. 18.

Figure 18:
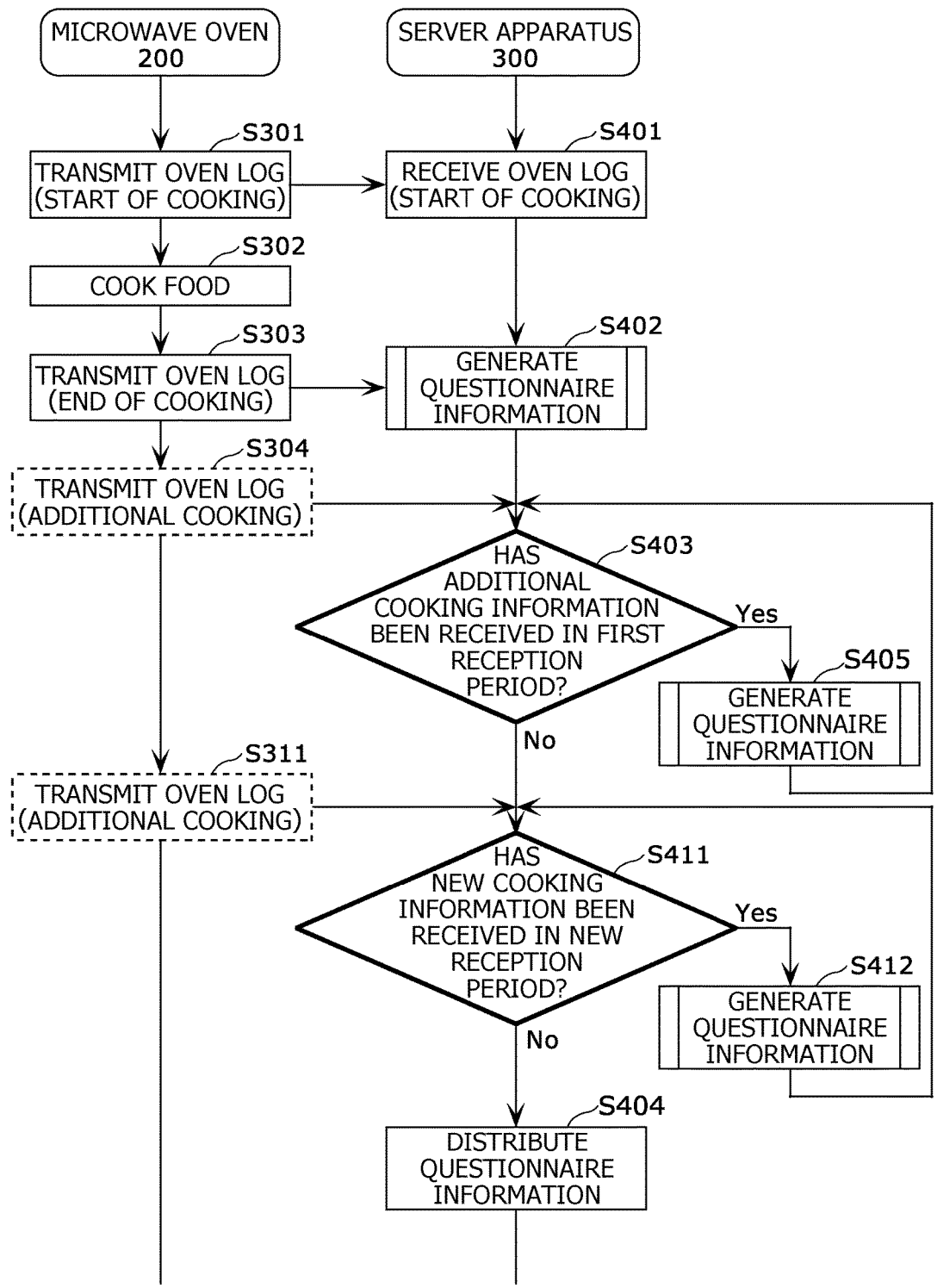
FIG. 18 is a sequence diagram illustrating another example of the process for transmitting a questionnaire to the microwave oven from the server apparatus.

FIG. 18 is a sequence diagram illustrating another example of the process for transmitting questionnaire information to the microwave oven 200 from the server apparatus 300.

Here, only processing performed after the distribution unit 305 determines that the reception unit 302 has not received additional cooking information in the first reception period (NO in S403), which is different from the processing illustrated in FIG. 16, will be described.

If determining that the reception unit 302 has not received additional cooking information in the first reception period (NO in S403), the distribution unit 305 determines whether new cooking information has been received in a new reception period (S411). The "new reception period" refers to a period that lasts a four certain period of time, which is longer than the first certain period of time, from the first end time.

If determining that new cooking information has not been received in the new reception period (NO in S411), the distribution unit 305 distributes questionnaire information (S404).

If determining that new cooking information has been received in the new reception period (YES in S411), the distribution unit 305 performs the same processing as in step S402 (that is, the processing illustrated in FIG. 17) to generate questionnaire information (S412).

That is, if the reception unit 302 does not receive new start information, which indicates that the microwave oven 200 has begun to perform the second cooking operation on the second food, in the new reception period, which lasts the fourth certain period of time, which is longer than the first certain period of time, from the first end time, and if the reception unit 302 has not received the first additional cooking information in the first reception period, the distribution unit 305 begins to distribute the first questionnaire information to the terminal device 100 as the display device. That is, the distribution unit 305 determines whether the microwave oven 200 has performed an additional cooking operation or the second cooking operation on the second food after performing the first cooking operation on the first food. If determining that an additional cooking operation or the second cooking operation has not been performed, the distribution unit 305 begins to distribute the first questionnaire information. As a result, questionnaire information is not distributed to the user while a cooking operation is being performed.

In this case, the new start information includes second identification information for identifying the second food, third end time information indicating a third end time, at which the second cooking operation ends, and third log information indicating an operation output and an operation time of the second cooking operation performed by the microwave oven 200.

The first food and the second food may be different from each other or may be the same.

Second Modification

As illustrated in FIG. 7A, the storage unit 306 of the server apparatus 300 stores, as a database, operation history information including information indicating times at which the microwave oven 200 has operated. If such times are stored as operation start times, the distribution unit 305 may, on the basis of the operation history information, begin to distribute the first questionnaire information in a period (hereinafter referred to as a "unused period") in which the microwave oven 200 is assumed to be not operating. In this case, the first questionnaire information can be distributed in the period in which the microwave oven 200 is assumed to be not operating on the basis of the operation history information, that is, the first questionnaire information can be distributed when it is convenient for the user to respond.

If the generation unit 304 has generated the fourth questionnaire information, the distribution unit 305 distributes the fourth questionnaire information generated by the generation unit 304 instead of the first questionnaire information.

More specifically, the period in which the microwave oven 200 is assumed to be not operating may be one of a plurality of periods in which the number of times that the microwave oven 200 has operated is smallest or a period of time for which the microwave oven 200 has operated is shortest or may be periods in which the number of times that the microwave oven 200 has operated is shorter than a certain threshold or the period of time for which the microwave oven 200 has operated is shorter than a certain threshold. Alternatively, periods other than a period in which the number of times that the microwave oven 200 has operated is largest or the period of time for which the microwave oven 200 has operated is longest may be periods in which the microwave oven 200 is assumed to be not operating.

If there are a plurality of (two or more) unused periods, questionnaire information may be distributed in one of the unused periods closest to a time at which the first food, for which a questionnaire is to be distributed, is cooked. By distributing questionnaire information in this manner, the questionnaire information is not distributed in a period after the first food is cooked in which another food is assumed to be being cooked. As a result, questionnaire information can be distributed when it is convenient for the user to respond.

The operation history information may further include information indicating a day in which the microwave oven 200 has operated. In this case, the log information transmitted from the microwave oven 200 may include a history of the times at which the microwave oven 200 has operated or the information indicating a day in which the microwave oven 200 has operated, or a day in which the microwave oven 200 has operated may be identified on the basis of an operation start time indicated by the log information received by the server apparatus 300. That is, information indicating a day need not be included insofar as information for identifying a day is included. In this case, the distribution unit 305 may, on the basis of the operation history information, begin to distribute the first questionnaire information in a period of a day in which the microwave oven 200 is assumed to be not operating. In this case, the period in which the microwave oven 200 is assumed to be not operating is identified in the day in which the first cooking operation has been performed by referring to day-to-day and period-to-period data regarding the number of times that the microwave oven 200 has operated or the period of time for which the microwave oven 200 has operated. Since the first questionnaire information can be distributed on the basis of the operation history information in the day in which the first cooking operation has been performed in the period in which the microwave oven 200 is assumed to be not operating, the first questionnaire information can be distributed when it is convenient for the user to respond. The period in which the microwave oven 200 is assumed to be not operating can be identified in the same manner as above.

Third Modification

Although the microwave oven 200 transmits the log information regarding the microwave oven 200 to the Internet 400 through the server apparatus 300 in the above embodiment, the microwave oven 200 may transmit the log information through the terminal device 100, instead.

Next, a process for uploading the log information regarding the microwave oven 200 to the server apparatus 300 performed by the terminal device 100 illustrated in FIG. 3 will be described.

Figure 19:
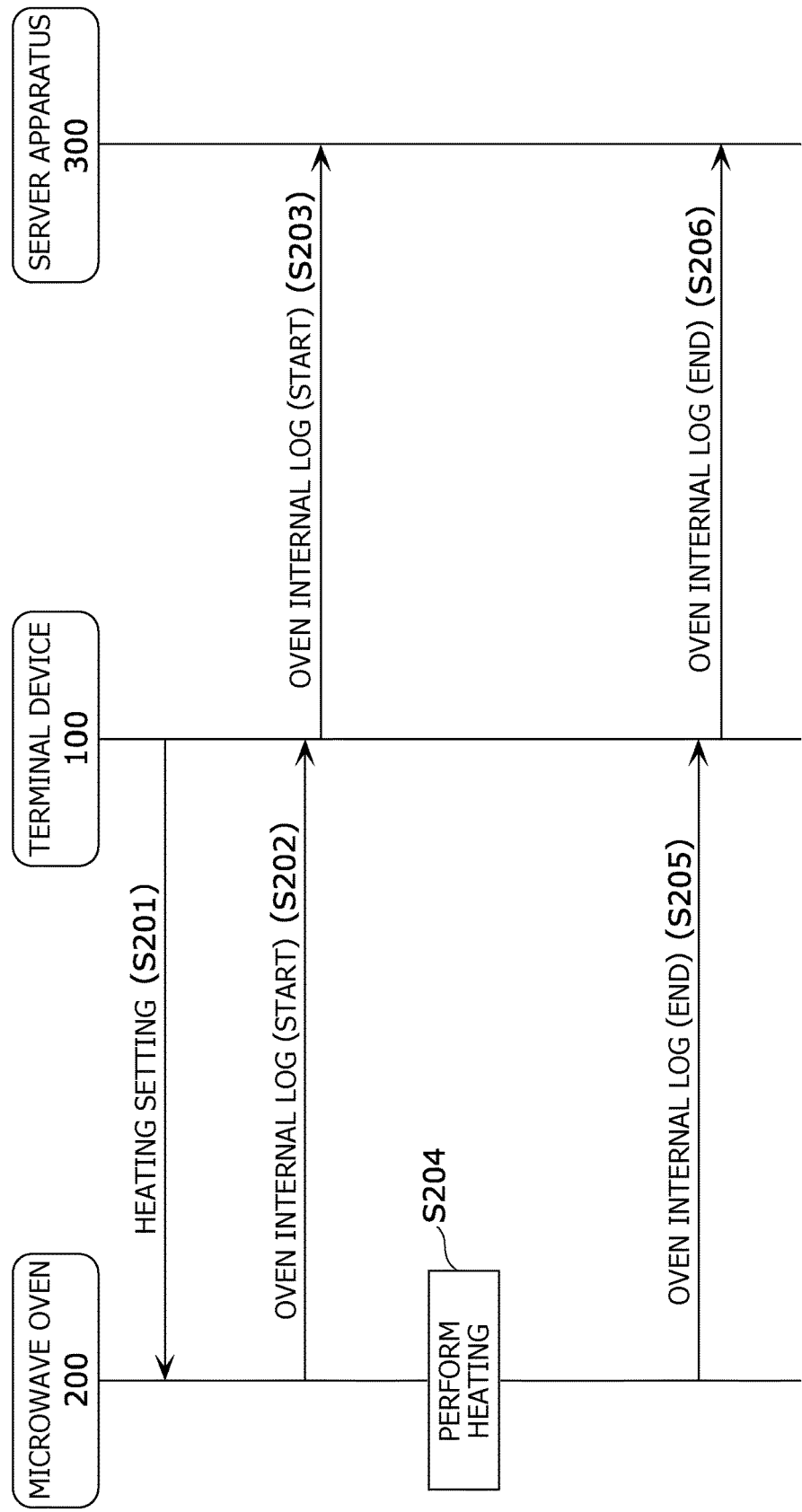
FIG. 19 is a sequence diagram illustrating a process for uploading log information regarding the microwave oven to the server apparatus performed by the terminal device.

FIG. 19 is a sequence diagram illustrating the process for uploading the log information regarding the microwave oven 200 to the server apparatus 300 performed by the terminal device 100.

First, the terminal device 100 (second communication unit 107) transmits a heating setting to the microwave oven 200 (communication unit 201) (S201). That is, the processing in S201 corresponds to the processing in S106 illustrated in FIG. 15. At this time, log information (oven internal log) regarding a start of a heating operation performed by the microwave oven 200 is transmitted to the terminal device 100 (S202).

The terminal device 100 (first communication unit 105) then transmits the received log information (oven internal log) to the server apparatus 300 (reception unit 302) (S203).

Next, the control unit 202 of the microwave oven 200 performs the heating operation in accordance with the heating setting received in S201 (S204).

After the heating operation ends, the terminal device 100 receives log information regarding the end of the heating operation from the microwave oven 200 when short-distance wireless communication has been established with the microwave oven 200 (S205). The terminal device 100 then adds a user ID to the received log information and transmits the log information to the server apparatus 300 (reception unit 302) (S206).

The log information regarding the start and end of the heating operation is saved to the storage unit 108 of the terminal device 100.

The server apparatus 300 (reception unit 302) saves the log information regarding the microwave oven 200 received from the terminal device 100 in step S206 to the database. Log information from a plurality of microwave ovens 200 is thus saved to the server apparatus 300.

Fourth Modification

Although the first questionnaire information or the fourth questionnaire information is distributed if the first additional cooking information has not been received in the first reception period in the above embodiment, the first questionnaire information may be distributed if it is determined that a heating operation has not been performed for a certain period of time after log information indicating an end of a cooking operation is received, instead. Alternatively, the first questionnaire information or the fourth questionnaire information may be distributed if it is determined using a smart meter, a human sensor, or the like that the user is not moving.

Figure 20:
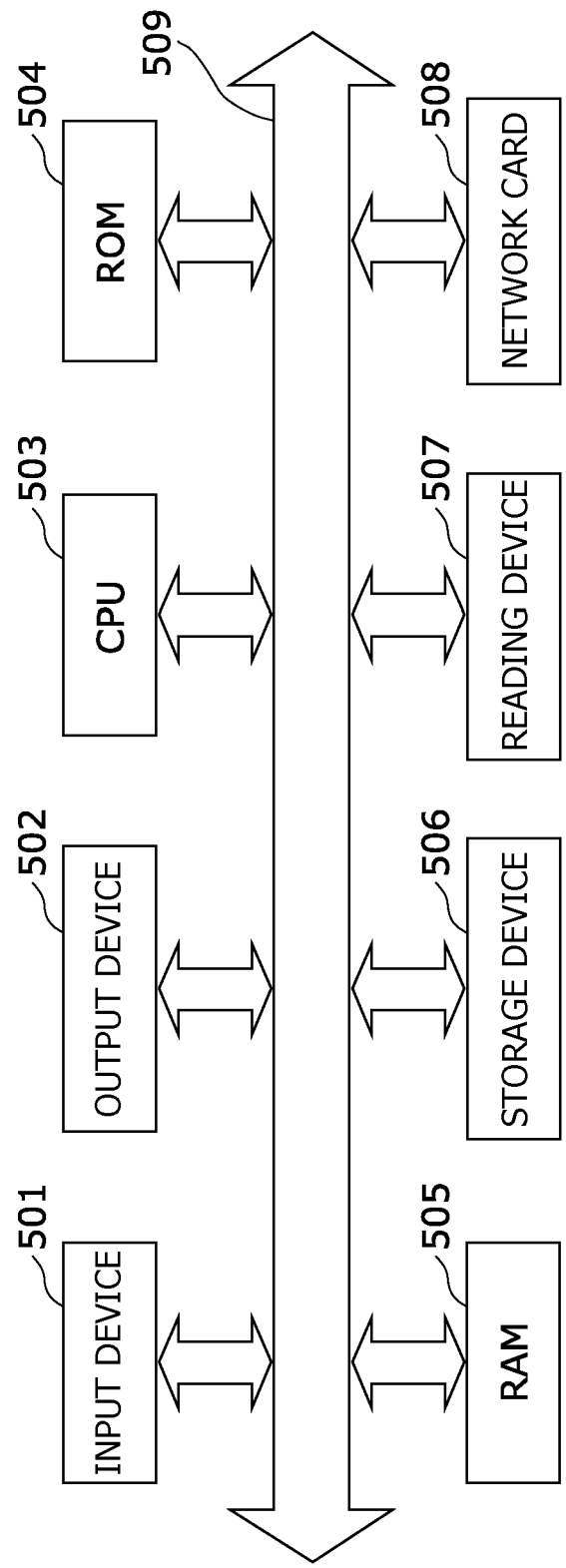
FIG. 20 is a diagram illustrating a hardware configuration of a computer that achieves functions of devices using a program.

FIG. 20 is a diagram illustrating a hardware configuration of a computer 500 that achieves functions of devices using a program. The computer 500 includes an input device 501 such as a keyboard, a mouse, or a touchpad, an output device 502 such as a display or a speaker, a central processing unit (CPU) 503, a read-only memory (ROM) 504, a random-access memory (RAM) 505, a storage device 506 such as a hard disk device or a solid-state drive (SSD), a reading device 507 that reads information from a recording medium such as a digital versatile disk read-only memory (DVD-ROM) or a universal serial bus (USB) memory, and a network card 508 that performs communication through a network. The components are connected to one another through a bus 509.

The reading device 507 reads the program for achieving the functions of the devices from the recording medium on which the program is recorded and stores the program in the storage device 506. Alternatively, the network card 508 communicates with a server apparatus connected to the network and stores the program for achieving the functions of the devices downloaded from the server apparatus in the storage device 506.

The CPU 503 then copies the program stored in the storage device 506 to the RAM 505. The CPU 503 sequentially reads commands included in the program from the RAM 505 and executes the commands to achieve the functions of the devices.

The techniques described in the above embodiment and modifications can be achieved, for example, by the following types of cloud service. The types of cloud service that achieve the techniques described in the above embodiment and modifications, however, are not limited to these.

Fifth Modification

Although a microwave oven is taken as an example in the above embodiment, the present disclosure can be applied to various cooking appliances including a microwave oven. The cooking appliances other than a microwave oven includes, for example, a toaster, an oven, a steam oven, a broiler, an induction heating (IH) cooking heater (or an electromagnetic cooker), and a gas stove. In any case, for example, a cooking operation performed with a standard setting (temperature, output, time, and the like) predetermined in the description of the product (a food or an ingredient) or a cooking recipe corresponds to the first cooking operation, and a cooking operation performed after the first cooking operation with a setting made by the user corresponds to the additional cooking operation. If chilled pizza for which a cooking setting "oven, 250° C., five minutes" is specified is cooked in an oven, for example, a heating operation performed by the oven at 250° C. for five minutes corresponds to the first cooking operation. If a user then performs an additional heating operation for two minutes, this corresponds to the additional cooking operation.

If a single cooking appliance has functions of a plurality of cooking appliances, such as a case in which a microwave oven has a function of an electric oven, for example, a cooking operation performed using a first function may correspond to the first cooking operation, and a cooking operation performed after the first cooking operation using a second function may correspond to the additional cooking operation.

Even in the case of a cooking appliance other than the above-described microwave oven, only the first cooking operation and the additional cooking operation are different from those performed by the microwave oven. An overall configuration of a system and processes performed are the same as in the case of the microwave oven, and description thereof is omitted.

First Service Type: Data Center Cloud Service

Figure 21:
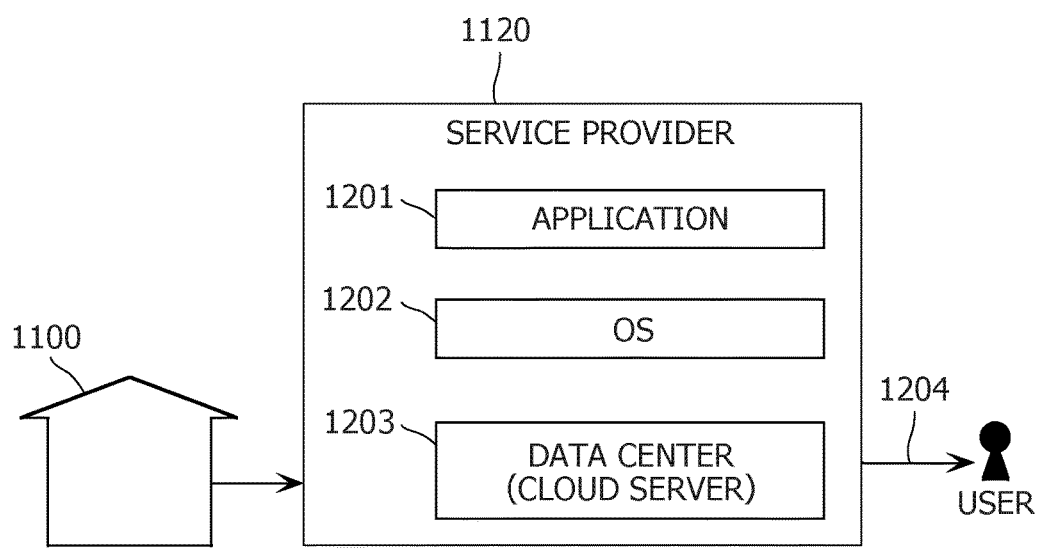
FIG. 21 is a diagram illustrating an outline of a service provided by an information management system according to a first service type (data center cloud service)

FIG. 21 is a diagram illustrating an outline of a service provided by an information management system according to a first service type (data center cloud service). In the first service type, the service provider 1120 obtains information from the group 1100 and provides the service for a user. In the first service type, the service provider 1120 has functions of data center management company. That is, the service provider 1120 owns the cloud server 1111 that manages big data. The information management system, therefore, does not include a data center management company.

In the first service type, the service provider 1120 manages a data center (cloud server) 1203. The service provider 1120 also manages an operating system (OS) 1202 and an application 1201. The service provider 1120 provides the service using the OS 1202 and the application 1201 managed by the service provider 1120 (arrow 1204).

Second Service Type: IaaS Cloud Service

Figure 22:
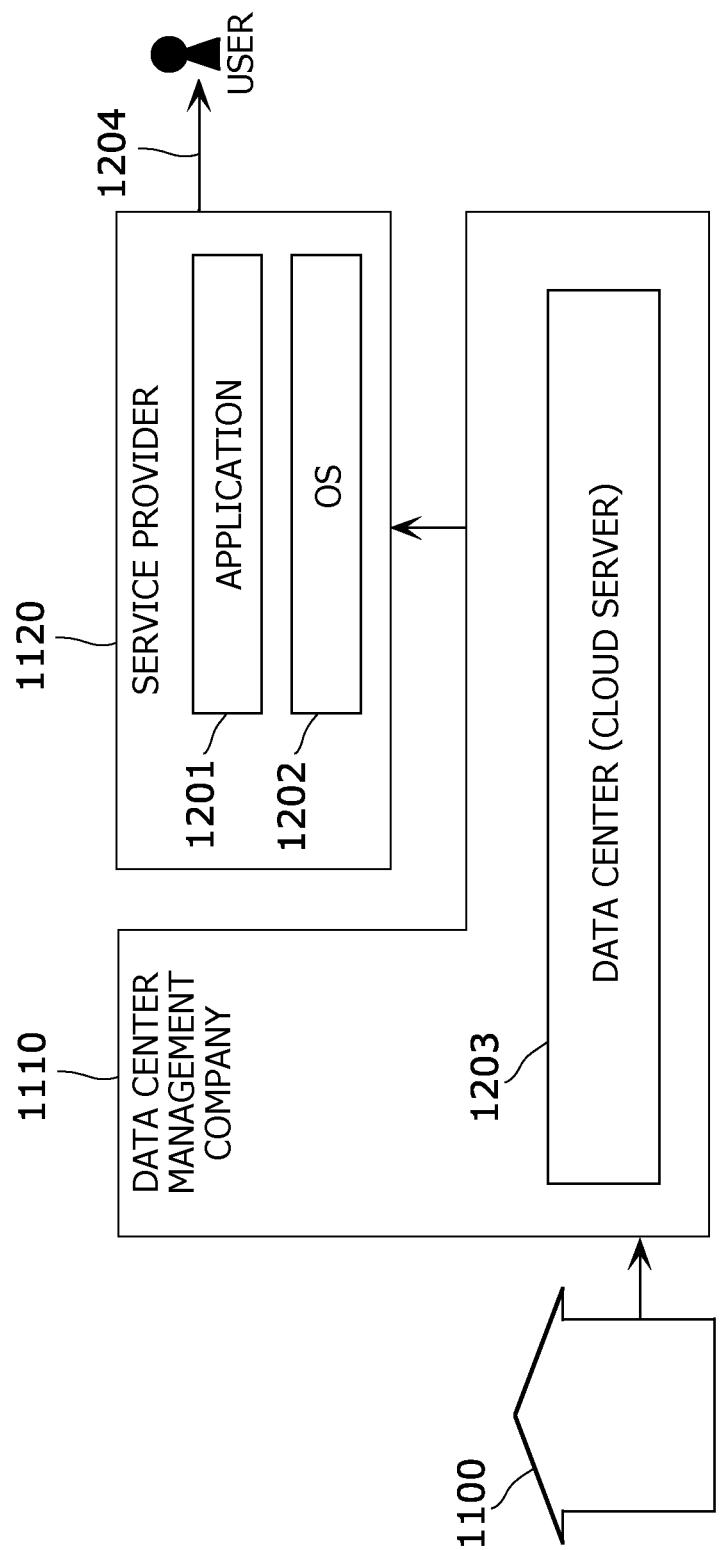
FIG. 22 is a diagram illustrating an outline of a service provided by an information management system according to a second service type (Infrastructure as a Service (IaaS) cloud service)

FIG. 22 is a diagram illustrating an outline of a service provided by an information management system according to a second service type (Infrastructure as a System (IaaS) cloud service). In the IaaS cloud service, an infrastructure itself for constructing and operating a computer system is provided as a service through the Internet.

In the second service type, the data center management company 1110 manages the data center (cloud server) 1203. The service provider 1120 also manages the OS 1202 and the application 1201. The service provider 1120 provides the service using the OS 1202 and the application 1201 managed by the service provider 1120 (arrow 1204).

Third Service Type: PaaS Cloud Service

Figure 23:
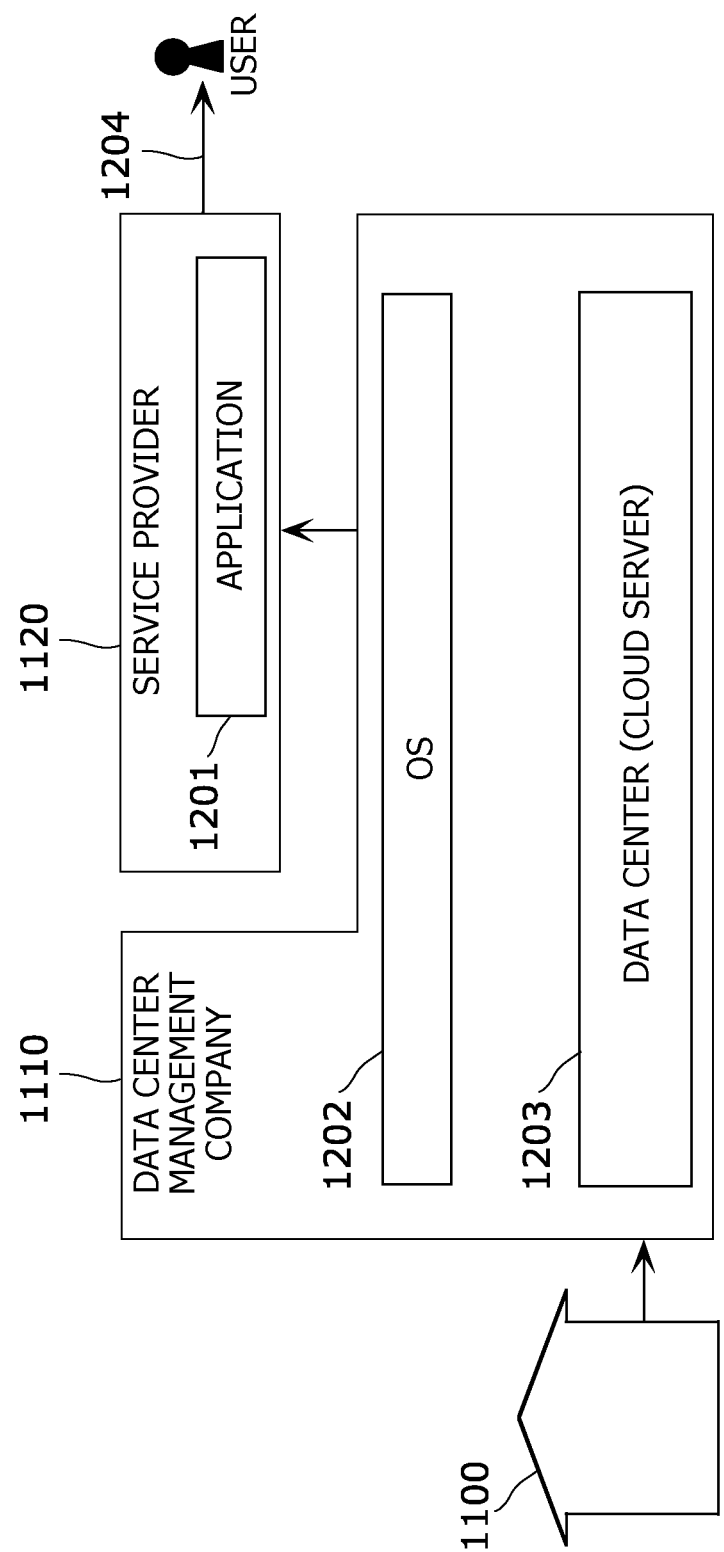
FIG. 23 is a diagram illustrating an outline of a service provided by an information management system according to a third service type (Platform as a Service (PaaS) cloud service)

FIG. 23 is a diagram illustrating an outline of a service provided by an information management system according to a third service type (Platform as a Service (PaaS) cloud service). In the PaaS cloud service, a platform for constructing and operating software is provided as a service through the Internet.

In the third service type, the data center management company 1110 manages the OS 1202 and the data center (cloud server) 1203. The service provider 1120 manages the application 1201. The service provider 1120 provides the service using the OS 1202 managed by the data center management company 1110 and the application 1201 managed by the service provider 1120 (arrow 1204).

Fourth Service Type: SaaS Cloud Service

Figure 24:
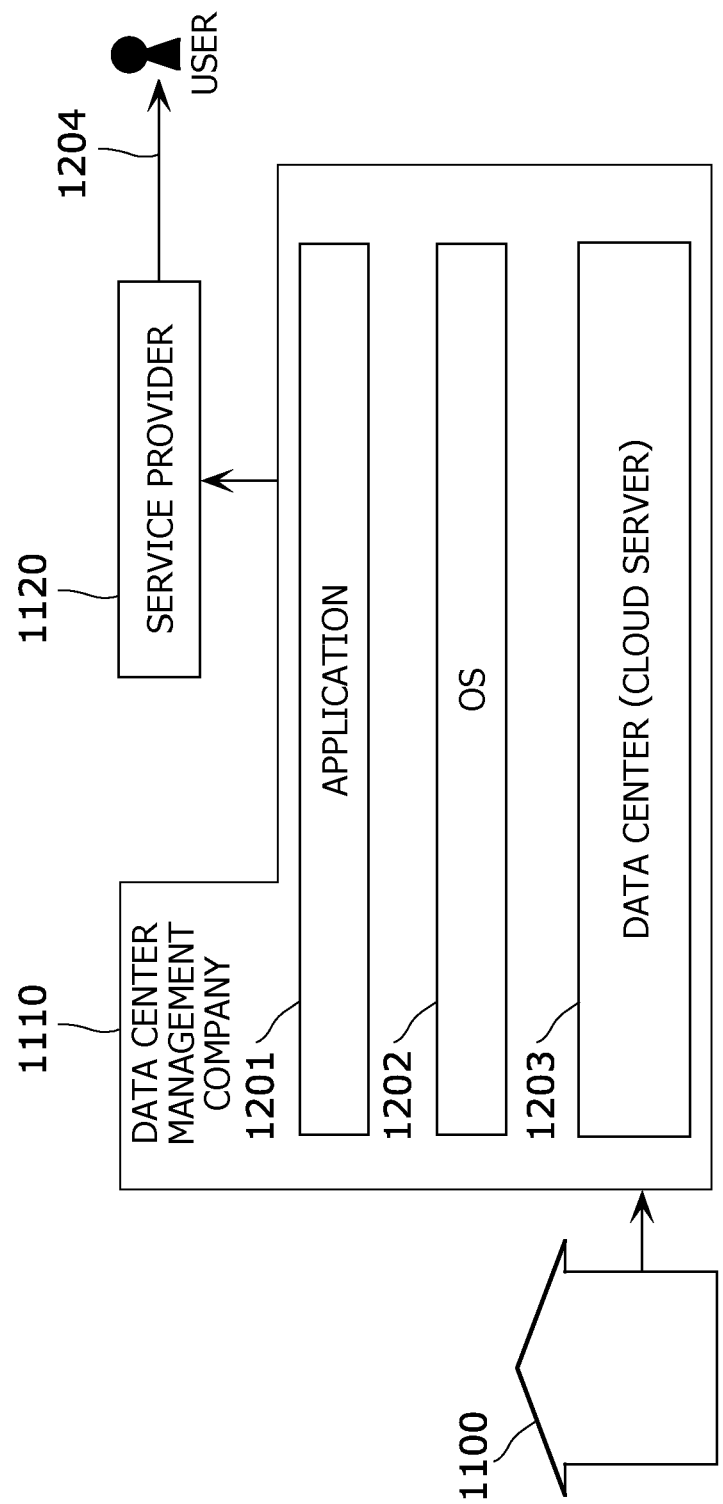
FIG. 24 is a diagram illustrating an outline of a service provided by an information management system according to a fourth service type (Software as a Service (SaaS) cloud service).

FIG. 24 is a diagram illustrating an outline of a service provided by an information management system according to a fourth service type (Software as a Service (SaaS) cloud service). In the SaaS cloud service, for example, a user such as a company or an individual who does not own a data center (cloud server) can use an application provided by a platform provider who owns a data center (cloud server) through a network such as the Internet.

In the fourth service type, the data center management company 1110 manages the application 1201, the OS 1202, and the data center (cloud server) 1203. The service provider 1120 provides the service using the OS 1202 and the application 1201 managed by the data center management company 1110 (arrow 1204).

In any of the above types of cloud service, the service provider 1120 provides a service. A service provider or a data center management company may develop an OS, an application, a database of big data, or the like or may outsource development work.

In each of the above embodiment and modifications, the components may be achieved by dedicated hardware or by executing a suitable software program. The components may be achieved by a program execution unit such as a CPU or a processor by reading and executing a software program recorded on a recording medium such as a hard disk or a semiconductor memory, instead. The software program that achieves the method for distributing information according to each of the above embodiment and modifications is as follows.

That is, the computer program causes a computer to implement a method for distributing information used by an information distribution system connected to a display device and a cooking appliance through a network. The method includes receiving, from the cooking appliance, first identification information for identifying a first food, first end time information indicating a first end time, at which a first cooking operation performed by the cooking appliance on the first food ends, and first log information indicating an operation output and an operation time of the first cooking operation performed by the cooking appliance, obtaining, on the basis of the received first identification information and first log information, first questionnaire information indicating a questionnaire relating to the first food from a memory, and distributing the first questionnaire information or questionnaire information generated using the first questionnaire information to the display device if first additional cooking information indicating that the cooking appliance has performed an additional cooking operation on the first food has not been received from the cooking appliance in a first reception period, which lasts a first certain period of time from the first end time.

Although the method for distributing information according to one or a plurality of aspects of the present disclosure has been described with reference to the above embodiment and modifications, the present disclosure is not limited to the above embodiment and modifications. The one or plurality of aspects of the present disclosure may include modes obtained by modifying the above embodiment and modifications in various ways conceived by those skilled in the art and modes constructed by combining components in different embodiment and modifications without deviating from the scope of the present disclosure.

The present disclosure is effective as a method for distributing information by which the first questionnaire information relating to the first food can be distributed when it is convenient for a user to respond.

What is claimed is:

1. A method for distributing information used by an information distribution system connected to a display device and a cooking appliance through a network, the method causes a processor of the information distribution system to execute comprising:

receiving, from the cooking appliance, first identification information for identifying a first food, first end time information indicating a first end time, at which a first cooking operation performed by the cooking appliance on the first food ends, and first log information indicating an operation output and an operation time of the first cooking operation performed by the cooking appliance;

obtaining, on the basis of the received first identification information and first log information, first questionnaire information indicating a questionnaire relating to the first food from a memory;

when first additional cooking information indicating that the cooking appliance has performed an additional cooking operation on the first food is not received before a first certain period elapses from the first end time, distributing the first questionnaire information or second questionnaire information, which is generated using the first questionnaire information, to the display device after a first certain period elapsed from the first end time, wherein the first additional cooking information includes second end time information indicating a second end time, at which the additional cooking operation performed by the cooking appliance ends, and second log information indicating an operation output and an operation time of the additional cooking operation performed by the cooking appliance; and when the first additional cooking information is received before the first certain period elapses from the first end time, obtaining third questionnaire information indicating a questionnaire relating to the first food from the memory on the basis of the first identification information, the first log information, and the second log information and distributing the third questionnaire information to the display device after a second certain period elapsed from the second end time, wherein the second certain period is a period during which second additional cooking information indicating that the cooking appliance has performed another additional cooking operation on the first food is not received.

2. The method according to claim 1,
   wherein the first questionnaire information or the second questionnaire information is distributed to the display device after a third certain period elapsed from a time when the first certain period had elapsed.

3. The method according to claim 1, further comprising:
   generating, when the obtained first questionnaire information includes a question asking about information indicated by the first log information, fourth questionnaire information by inputting an answer to the question on the basis of the first log information; and
   distributing the fourth questionnaire information to the display device as the second questionnaire information after the first certain period elapsed from the first end time.

4. The method according to claim 1, further comprising:
   obtaining fifth questionnaire information indicating a questionnaire including a question relating to the first food from the memory on the basis of the first identification information and the first log information; and
   distributing the fifth questionnaire information to the display device before the first end time,
   wherein the question relating to the first food included in the questionnaire indicated by the fifth questionnaire information is different from a question asking about an impression on the first food that a user has eaten.

5. The method according to claim 4, further comprising:
   generating, when questionnaire response information indicating a response to the fifth questionnaire information is not received from the cooking appliance before the first questionnaire information is distributed, sixth questionnaire information including the question indicated by the first questionnaire information, the question included in the questionnaire indicated by the fifth questionnaire information, and the question asking about an impression on the first food that the user has eaten; and
   distributing the sixth questionnaire information to the display device as the second questionnaire information after the first certain period elapsed from the first end time.

6. The method according to claim 1,
   wherein the display device is included in an information terminal connected to the information distribution system through the network, and
   wherein the cooking appliance communicates with the information distribution system through the information terminal.

7. The method according to claim 1,
   wherein, in the distributing the first questionnaire information or the second questionnaire information, the first questionnaire information or the second questionnaire information is distributed to the display device after a fourth certain period elapsed from the first end time, wherein the fourth certain period is a period during which new start information indicating that the cooking appliance has started a second cooking operation on a second food is not received, wherein the fourth certain period is longer than the first certain period.

8. The method according to claim 7,
wherein the new start information includes second identification information for identifying the second food, third end time information indicating a third end time, at which the second cooking operation ends, and third log information indicating an operation output and an operation time of the second cooking operation performed by the cooking appliance.

9. The method according to claim 7,
wherein the first food and the second food are different from each other.

10. The method according to claim 7,
wherein the first food and the second food are the same.

11. The method according to claim 1,
wherein the information distribution system includes a database that stores operation history information including information indicating a history of times at which the cooking appliance has operated, and
wherein, in the distributing the first questionnaire information or the second questionnaire information, the first questionnaire information or the second questionnaire information is distributed to the display device on the basis of the operation history information in a period in which the cooking appliance is assumed to be not operating.

12. The method according to claim 11,
wherein the operation history information further includes information indicating a day in which the cooking appliance has operated, and
wherein, in the distributing the first questionnaire information or the second questionnaire information, the first questionnaire information or the second questionnaire information is distributed to the display device on the basis of the operation history information in the day in which the first cooking operation has been performed in a period in which the cooking appliance is assumed to be not operating.

13. A server apparatus connected to a display device and a cooking appliance through a network, the server apparatus comprising:
a processor; and
a memory that sores a program,
wherein, the program causes the processor to execute:
receiving first identification information for identifying a first food, first end time information indicating a first end time, at which a first cooking operation performed by the cooking appliance on the first food ends, first log information indicating an operation output and an operation time of the first cooking operation performed by the cooking appliance, and first additional cooking information indicating that the cooking appliance has performed an additional cooking operation on the first food;
obtaining, on the basis of the first identification information and first log information received by the receiver, first questionnaire information indicating a questionnaire relating to the first food from a memory; and
when first additional cooking information indicating that the cooking appliance has performed an additional cooking operation on the first food is not received before a first certain period elapses from the first end time, distributing the first questionnaire information or second questionnaire information, which is generated using the first questionnaire information, to the display device after a first certain period elapsed from the first end time, wherein the first additional cooking information includes second end time information indicating a second end time, at which the additional cooking operation performed by the cooking appliance ends, and second log information indicating an operation output and an operation time of the additional cooking operation performed by the cooking appliance; and
when the first additional cooking information is received before the first certain period elapses from the first end time, obtaining third questionnaire information indicating a questionnaire relating to the first food from the memory on the basis of the first identification information, the first log information, and the second log information and distributing the third questionnaire information to the display device after a second certain period elapsed from the second end time,
wherein the second certain period is a period during which second additional cooking information indicating that the cooking appliance has performed another additional cooking operation on the first food is not received.

14. A network system comprising:
an information terminal including a display device;
a cooking appliance; and
an information distribution system connected to the information terminal and the cooking appliance through a network,
wherein, the information distribution system includes:
a processor; and
a memory that stores a program,
wherein, the program causes the processor to execute:
receiving first identification information for identifying a first food, the first identification information being transmitted by the information terminal, first end time information indicating a first end time, at which a first cooking operation performed by the cooking appliance on the first food ends, the first end time information being transmitted by the cooking appliance, first log information indicating an operation output and an operation time of the first cooking operation performed by the cooking appliance, and first additional cooking information indicating that the cooking appliance has performed an additional cooking operation on the first food;
obtaining, on the basis of the first identification information and the first log information received by the receiver, first questionnaire information indicating a questionnaire relating to the first food from a memory; and
when first additional cooking information indicating that the cooking appliance has performed an additional cooking operation on the first food is not received before a first certain period elapses from the first end time, distributing the first questionnaire information or second questionnaire information, which is generated using the first questionnaire information, to the information terminal after a first certain period elapsed from the first end time, wherein the first additional cooking information includes second end time information indicating a second end time, at which the additional cooking operation performed by the cooking appliance ends, and second log information indicating an operation output and an operation time of the additional cooking operation performed by the cooking appliance; and when the first additional cooking information is received before the first certain period elapses from the first end time, obtaining third questionnaire information indicating a questionnaire relating to the first food from the memory on the basis of the first identification information, the first log information, and the second log information and distributing the third questionnaire information to the display device after a second certain period elapsed from the second end time, wherein the second certain period is a period during which second additional cooking information indicating that the cooking appliance has performed another additional cooking operation on the first food is not received.

* * * * *